US011769034B2

(12) United States Patent
Pavloski

(10) Patent No.: US 11,769,034 B2
(45) Date of Patent: Sep. 26, 2023

(54) SENSE ELEMENT ENGAGEMENT PROCESS OF CORTICAL PROSTHETIC VISION BY NEURAL NETWORKS

(71) Applicant: Raymond Pavloski, Indiana, PA (US)

(72) Inventor: Raymond Pavloski, Indiana, PA (US)

(73) Assignee: INNER PSYCHOPHYSICS IP LLC

( * ) Notice: Subject to any disclaimer, the term of this patent is extended or adjusted under 35 U.S.C. 154(b) by 0 days.

(21) Appl. No.: 18/063,232

(22) Filed: Dec. 8, 2022

(65) Prior Publication Data

US 2023/0177306 A1 Jun. 8, 2023

Related U.S. Application Data

(60) Provisional application No. 63/287,286, filed on Dec. 8, 2021.

(51) Int. Cl.
*G06N 3/02* (2006.01)
*G06T 9/00* (2006.01)

(52) U.S. Cl.
CPC ............... *G06N 3/02* (2013.01); *G06T 9/002* (2013.01)

(58) Field of Classification Search
None
See application file for complete search history.

(56) References Cited

U.S. PATENT DOCUMENTS

2019/0201693 A1 7/2019 Nirenberg
2021/0346096 A1 11/2021 He et al.

OTHER PUBLICATIONS

Lewisa et al ("Restoration of vision in blind individuals using bionic devices: A review with a focus on cortical visual prostheses" 2015) (Year: 2015).*
Ayton et al ("An update on retinal prostheses" 2019) (Year: 2019).*

(Continued)

*Primary Examiner* — Lut Wong
(74) *Attorney, Agent, or Firm* — ACKER WOOD IP LAW LLC; Gwen R. Acker Wood

(57) ABSTRACT

The invention employs sense element engagement theory to provide a sense element engagement process for producing self-organized patterns of interaction strengths among electronic neurons in an electronic neural network which coordinate with models of patterns of phosphenes experiences and the visual space in which they are located; documented by individuals whose primary visual cortex is stimulated by electric current. The process may be employed for other experiential patterns by substituting desired model patterns for patterns comprising the experience of phosphenes in a visual space. If such experiential patterns are produced, then devices that implement the process can be sentient. Also provided is an understanding of how neural networks produce a specific quality of experience. The phenomena that comprise cortical prosthetic vision (CPV) include two properties: subjective qualities of CPV models can be constructed; and such models can be related to objective aspects of CPV models.

15 Claims, 17 Drawing Sheets

(56) References Cited

OTHER PUBLICATIONS

Pavloski, Raymond, "Simulations Support the Simple Hypothesis that Persistent Coupling of Electrochemical Activity in Recurrent Network Neurons is an Objective Signature of Visual Object Unity," pp. 673-680, IEEE, 2017 International Joint Conference on Neural Networks (IJCNN) [online]; May 14, 2017, [Retrieved on Mar. 27, 2023] Retrieved from the internet <URL: https://ieeexplore.ieee.org/document/7965917>; DOI: 10.1109/IJCNN.2017.7965917.

Bosking, W.H., "Electrical Stimulation of Visual Cortex, Relevance for the Development of Visual Cortical Prosthetics," pp. 141-166, National Library of Medicine. Publication [online], Sep. 15, 2017; [Retrieved on Mar. 27, 2023] Retrieved from the internet <URL: https:/pubmed.ncbi.nim.nih.gov/28753382/>, DOI: 10.1146/annurev-vision-111815-114525.

Pavloski, Raymond, "Sense Element Engagement Theory Explains How Neural Networks Produce Cortical Prosthetic Vision," TECHRXIV, Publication [online]; Dec. 13, 2021, [Retrieved on Mar. 27, 2023] Retrieved from the internet <URL: https://iwww.techrxiv.org/articles/preprint/Sense_Element_Engagement_Theory_Explains_How_Neural_Networks_Produce_Cortical_Prosthetic_Vision/,17161187/1/files/31730702.pdf>.

Pavloski, Raymond, Progress in Developing an Emulation of a Neuromorphic Device That Is Predicted to Enhance Existing Cortical Prosthetic Vision Technology by Engaging Desired Visual Geometries MDPI, Publication [online]; Oct. 24, 2022, [Retrieved on Mar. 27, 2023].

\* cited by examiner

FIG. 3
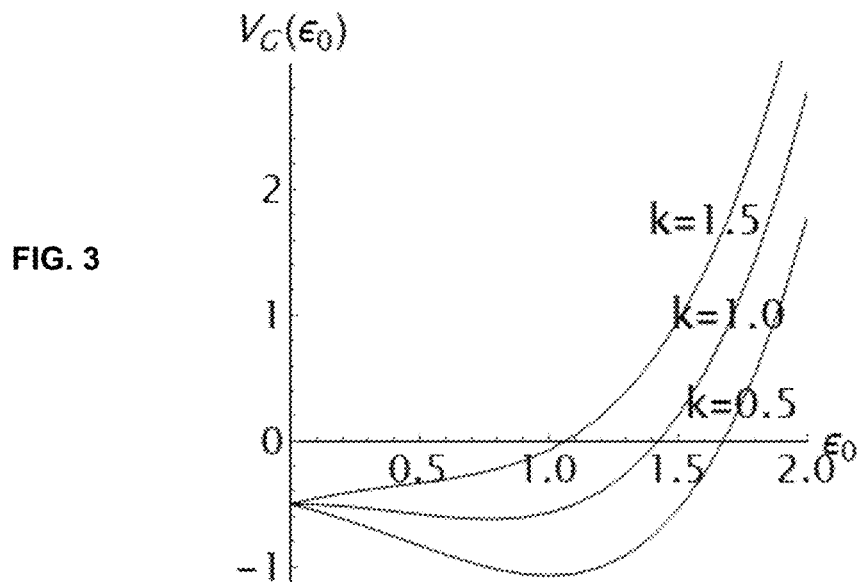
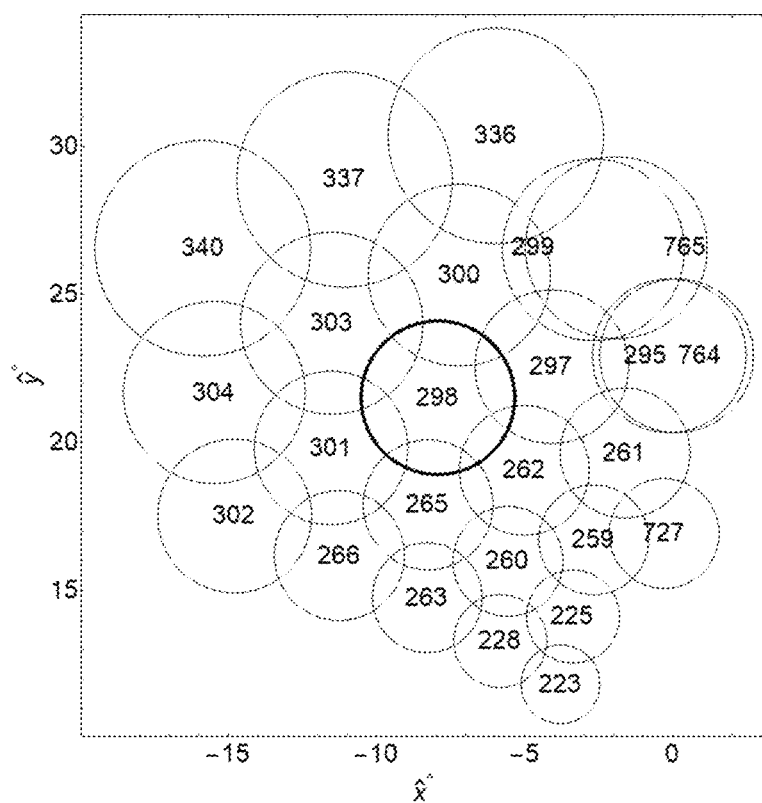
FIG. 4

SENSE ELEMENT ENGAGEMENT PROCESS OF CORTICAL PROSTHETIC VISION BY NEURAL NETWORKS

CROSS REFERENCE TO RELATED APPLICATIONS

The present application claims priority to U.S. Provisional Application No. 63/287,286, filed Dec. 8, 2021, which is incorporated herein by reference in its entirety.

FIELD OF THE INVENTION

The present invention relates to cortical prosthetic vision processes and, particularly, to production of cortical prosthetic vision by neural networks via a sense element engagement process.

BACKGROUND OF THE INVENTION

According to D. J. Chalmers, our understanding of vision, like our understanding of all sensory modalities, is limited by the "Hard Problem" of comprehending how a quality of experience can arise from the physical behavior of networks of interacting neurons (D. J. Chalmers, "Facing up to the Problem of Consciousness," *J. of Consciousness Studies*, vol. 2, no. 3, pp. 200-219, 1995). An instructive illustration of this limitation is provided by the attempt to develop a useful cortical visual prosthesis (CPV) that delivers electric current to small volumes of primary visual cortex (V1) in response to video image data. At many sites in V1, such stimulation results in perception of a phosphene, a bright spot of light that is perceived to occupy a region of visual space, and simultaneous stimulation of multiple sites produces multiple discrete phosphenes.

It has been known since the early twentieth century that stimulation of a spatially localized population of neurons in V1 results in the experience of a phosphene. However, the feasibility of using cortical stimulation for prosthetic vision was not explored until the publication of a dramatic demonstration in 1958 by J. C. Button (Electronics brings light to the blind," *Radio Electronics*, vol. 29, pp. 53-55, 1958). From that time until the present, direct cortical stimulation during neurosurgery and stimulation controlled by video images have been used to produce multiple distinct phosphenes each of which is experienced as occupying a continuous region in visual space. An implant recipient can point to the perceived locations of phosphenes and describe their brightness, size and shape as though they were physical objects in the environment.

An increase in phosphene size with visual eccentricity is attributed to the well-known V1 cortical magnification factor. V1 is organized functionally into cortical columns containing circuits responsible for identifying the opponent-color wavelength components of light, orientation, movement, and spatial extent of contrast, and binocular disparities for input that originates in specific regions of the retinas. The magnification factor describes the observation that a very small area in the central portion of each retina is represented by neurons in a cortical column of V1, and as retinal eccentricity increases an increasingly large area is represented by a cortical column. Consistent with cortical magnification, stimulating neurons within a column that represents a central portion of the retina yields a much smaller phosphene than does stimulating neurons within a column that represents a more peripheral portion of the retina.

It is known that the size of phosphenes also increases with stimulating current up to a certain value, at which the effect saturates. Based on experiments conducted in macaque monkeys, it has been estimated that 1.9 µA (the lowest current delivered through a microelectrode used for the induction of phosphenes) activates a volume of $6.2 \times 10^{-4}$ mm$^3$ of tissue containing 75 neurons. It has been estimated that currents less than 100 µA are necessary to activate subregions of a column using a microelectrode that penetrates the surface of the cortex. The currents used with surface electrode implants typically are much larger and likely stimulate a large proportion of the neurons in a cortical column.

FIG. 1A shows a previously reported simulated phosphene representation of the uppercase letter "X". The phosphenes have been rotated about the coordinates of the center of the letter to minimize the sum of the distances of each phosphene from a corresponding pixel representation of the letter. When appropriately sized and viewed from a distance of 54 cm, the letter is centered at (−7.5°, 8.5°) from the direction of gaze in degrees of visual angle. As illustrated by FIG. 1A, implant recipients can perceive phosphenes within regions of visual space that are determined by the positions of stimulating electrodes. Electrodes are implanted some distance away from the cortical columns that represent the central portion of each retina so that each phosphene is located some distance from the direction of gaze. An attempt to "look at" a phosphene by moving the eyes causes its apparent position in the environment to change so that it retains a fixed visual-spatial relationship to the direction in which the eyes are pointing.

FIG. 1(B) illustrates that visual fusion of appropriate pairs of phosphenes that produce a single unified visual image for each letter might improve CPV. With one exception, perception of continuous visual forms has never been reported. When current is delivered simultaneously through multiple electrodes, an implant recipient reports seeing multiple discrete phosphenes and must therefore infer what object in the environment they represent. The perception of continuous visual forms in a group of sighted and blind volunteers has been reported. A technique known as current steering was used to "trace" the pattern of each letter by activating electrodes sequentially and dramatic increases in the ability of volunteers to identify shapes correctly was found. It was suggested that this technique may activate visual motion circuits that, in turn, result in form perception. Although this was a plausible suggestion, it does not address the question of how the experience of either discrete or unified phosphenes or of the visual space which phosphenes populate arises from activity in neural networks.

Phosphenes and the visual space which they populate have no place in the current theoretical framework of neuroscience. The systems of equations that are employed in computational neuroscience are informative and useful because they describe the behavior of entities such as electric potential and ionic current, and because there are theories which describe how those values evolve in time and are related to the values of other such entities. Although the subjective qualities of CPV cannot be directly measured, experiences as shared through subjective reports allow models of these qualities to be constructed. This raises the question of whether the formalisms used in these models can in principle be included in the systems of equations employed in neural network models. Such inclusion of modeled qualities of experience would have direct applications to the improvement of CPV. For example, it might make it possible to construct a prosthesis that yields perception of unified visual forms from the simultaneous stimulation of multiple cortical sites. Unfortunately, the Hard Problem defeats any attempt to include modeled visual qualities in neural network models: if we do not understand how such qualities can arise from the behavior of neurons, then we do not understand their relationships to entities such as potential and ionic current. It therefore is necessary to make use of a perspective on the Hard Problem for which relationships between the subjective qualities of prosthetic vision and corresponding objective quantities seem reasonable and natural.

It is possible to deal with the Hard Problem in a practical and useful way. In chapter 12 of "The Nature of the Physical World," A. S. Eddington notes that measurements provide all that can be known of what necessarily are enigmatic physical phenomena, that is, phenomena the intrinsic nature of which cannot be known. He states that this situation compels us to attach our measurements to a background that is consistent with the existence of those phenomena. For example, we implicitly attach measurements of the elements of patterns and structures that involve quantities such as displacement or duration to space and time backgrounds that are consistent with the existence of those measurements. When Eddington turns to the mental aspects of doing natural science as comprising additional natural phenomena requiring explanation, he states that it would be "silly" to attach thought to something of a "concrete" nature that is inconsistent with the qualities of experience and then to wonder where those qualities come from (A. S. Eddington, *The Nature of The Physical World*. The Macmillan Company: New York, N.Y., USA, 1928, pp. 257-260).

A year following Chalmers portrayal of the Hard Problem, P. Hut and R. N. Shepard described a perspective which led them to suggest that there was a "sense" or "X" background, on a par with space (S) and time (T) backgrounds, which provides the "condition of possibility for experience" (P. Hut, and R. N. Shepard, "Turning 'The Hard Problem' Upside Down & Sideways," *J. Consciousness Studies*, vol. 3, no. 4, pp. 313-329, April, 1996). The sense background is well aligned with A. S. Eddington's posit that one accept the significance of the background to which we attach our measurements, "namely that it has a nature capable of manifesting itself as mental activity" (Ibid, 260).

The sense element engagement theory of CPV assumes the existence of a sense background. Phenomena that characterize the objective spatiotemporal (ST) aspects and the subjective sensible-temporal (XT) aspects of CPV are viewed as projections of macroscopic self-organized patterns in space, sense and time (i.e., SXT patterns) which arise from neural interactions that meet specific criteria. What the theory adds to accounts of behavioral and neural self-organized patterns is the proposal that interactions take place in space, time, and sense.

From this perspective, the issue of whether qualities of a CPV experience influence neural activities, a difficulty for a viewpoint that is referred to as "the standard scientific approach" does not arise. According to the sense element engagement theory, the observed coordination of visual experience with objective neural quantities may be described by mappings X→S analogous to the manner in which an observed coordination of spatial location with measured time during motion is described in the form of mappings T→S. In classical mechanics, mappings T→S are found by integrating a mathematical statement of Newton's second law. In the case of CPV, the theory proposes a process by which mappings X→S result from neural interactions. In neither case is a causal relationship from the domain to the range of the mapping implied.

In keeping with the perspective that Hut and Shepard advanced, interactions are viewed as partaking of a sense background the same way they partake of time and space backgrounds. Referring to the Newtonian example, there are no instantaneous changes in spatial position, and the mappings T→S that reflect this empirical fact reveal how physical interactions necessarily partake of time. The sense element engagement theory rests on an assumption that certain interactions necessarily engage specific elements of patterns in SXT in a manner that is reflected by common neural network-wide mappings X→S.

This assumption has several important implications. The subjective qualities of visual distance, direction, and size and the qualities of differences in lightness between regions in visual space are taken to be properties of the elements of a projection of the SXT pattern on XT just as correlated objective quantities such as interaction strengths are properties of the elements of a projection of the SXT pattern on ST. The theory asserts that a specific neural interaction engages an element of a subjective visual geometry pattern or an element of a lightness pattern as we might assert that the interaction occupies or occurs within some volume of a spatial pattern.

SUMMARY OF THE INVENTION

The present invention employs the use of the sense element engagement theory to provide a sense element engagement process for producing self-organized patterns of strengths of interaction among electronic neurons in an electronic neural network (ENN) that coordinate with models of patterns of experiences of phosphenes and the visual space in which they are located as reported by individuals whose primary visual cortex (V1) is stimulated by electric current. The process may be employed for other patterns of experience by substituting models of the desired patterns for patterns consisting of the experience of phosphenes in a visual space. Whether patterns of actual experiences also are produced by this process has yet to be determined. If such patterns of experiences can be produced, then devices that implement the process will be sentient.

In particular, the present invention provides a sense element engagement process for creating visual geometry and lightness interval distribution of space, sense, and time (SXT) patterns which characterize CPV in order to make predictions for testing an aspect of a visual experience on individuals The process comprises the steps of (a) identifying an aspect of a visual experience to be engaged by an electronic neural network (ENN); (b) conceptualizing the aspect of the visual experience and coordinated portions of interactions in a neural network as jointly constituting an SXT pattern which is characterized by one or more order parameters; (c) modeling the SXT pattern using mappings comprised of spatiotemporal (ST) to sensible-temporal (XT); (d) describing emergence of self-organization of the SXT pattern; (d) creating a simulation of a system of synaptic interactions; and (e) employing results of simulations to create a physical instantiation of the system of synaptic interactions in an ENN.

Modeling the SXT pattern using mappings comprised of spatiotemporal (ST) to sensible-temporal (XT) further comprises specifying a system of synaptic interactions which engage sense (X) elements of the SXT pattern; identifying a state of the neural network that coordinates with a stable SXT pattern; identifying the X element of the SXT pattern on which strengths of synaptic interactions in the system depend; and identifying a control parameter having a critical value above which the SXT pattern emerges.

The emergence of self-organization of the SXT pattern further comprises specifying temporal variations in the order parameter of the SXT pattern which depend on a value of a potential; providing a mathematical description of the potential as a function of the one or more order parameters and the control parameter; introducing a mapping from the values of a variable that behaves like the X element of the SXT pattern on which strengths of synaptic interactions depend; identifying an ST variable that is coordinated with the order parameter and possessing variability which accounts for the dependence of the order parameter on the value of the potential; and specifying mappings of X to S which emerge from the identification of the ST variable.

The sense element engagement process of the invention further comprises predicting how modification of one or more parameters of the neural network produces a change in the aspect of the visual experience in an individual.

By using the simulations and the ENN, the sense element engagement process of the invention may be used to develop hardware capable of modifying the visual experience in an individual. Such hardware may be employed for the development of machine intelligence. In addition, the sense element engagement process may be employed for other aspects of human sentience such as hearing, taste, smell, and touch.

BRIEF DESCRIPTION OF THE DRAWINGS

For the present disclosure to be easily understood and readily practiced, the present disclosure will now be described for purposes of illustration and not limitation in connection with the following figures FIGS. 1A, 1B, and 1C show simulated phosphene representations of the uppercase letter "X", wherein FIG. 1A is a discrete phosphene representation; FIG. 1B is a simulation of a representation based on an alteration of the visual geometry in which phosphenes appear; and FIG. 1C is a representation that is based on an alternative alteration of the visual geometry.

FIG. 3 shows the potential landscape described by (5) and (8).

FIG. 4 shows the visual regions employed in simulations.

FIG. 15A shows clear differences between the distributions whereas FIG. 15B shows distributions that appear to be more similar and suggest that correct classification of the expected number of phosphenes would be difficult.

DETAILED DESCRIPTION OF THE INVENTION

The invention is more fully understood by delineating the theory presented herein, which asserts that the phenomena of CPV are self-organized patterns produced by neural interactions. CPV is focused on because understanding how neural interactions produce any quality of experience would be a scientific milestone and set the stage for technological innovations and because the subjective experiences that arise in CPV and their neural basis are amenable to modeling.

Sense element engagement theory is made possible by the perspective that is adopted in conceptualizing how a quality of experience can arise from the physical behavior of networks of interacting neurons. Providing such a conceptualization has been termed the "Hard Problem." Although previous work has revealed suggestive relationships between patterns of activity in neural network simulations and qualitative and quantitative aspects of specific visual experiences, the physical implications of the relationships are not understood. The perspective on the Hard Problem provided herein allows for the comprehension of the experiences reported in CPV and certain coordinated neural interactions as jointly constituting sensible spatiotemporal patterns and to predict that altering a specific aspect of neural interactions will produce a specific change in a visual quality of these patterns.

I. Sense Element Engagement Theory

A. Visual Geometry and Lightness Interval Distribution Models of CPV

The results of CPV research suggest that the visual geometry in which phosphenes appear can be modeled using an idealized relationship between coordinates in V1 and visual coordinates. Cartesian coordinates (x, y) of a flattened geometry of the V1 surface can be obtained as functions of retinal image eccentricity $\varepsilon_r$ and azimuth $a_r$ coordinates, $$x = \gamma \ln\left(1 + \frac{\varepsilon_r}{\varepsilon_0}\right), \quad y = \frac{-\gamma \varepsilon_r \pi a_r}{(\varepsilon_0 + \varepsilon_r)180°}. \quad (1)$$

Equation (1) has been derived by others by assuming that x ($\varepsilon_r$) is a function of eccentricity only and that y ($\varepsilon_r$, $a_r$) is proportional to $a_r$, and by using results from research on the macaque monkey to obtain the relationship $M(\varepsilon_r)=\gamma/(\varepsilon_0+\varepsilon_r)$, where $M(\varepsilon_r)$ is the magnification factor in mm/degree. The quantities $\varepsilon_0$ and $\gamma$ are estimated from data. The inverses of equation (1) can then be used to approximate visual geometry coordinates from V1 coordinates as:

$$\hat{\varepsilon}=\varepsilon_0[\exp(x/\gamma)-1], \quad (2)$$

$$\hat{a}=-180° \, y \, \exp(x/\gamma)/\gamma\pi[\exp(x/\gamma)-1]$$

in which $\hat{\varepsilon}$ and $\hat{a}$ denote values of a visual geometry eccentricity coordinate and a visual azimuth coordinate, respectively, and $\varepsilon_0$ and $\gamma$ are treated as order parameters of a visual geometry pattern.

Figure 2A:
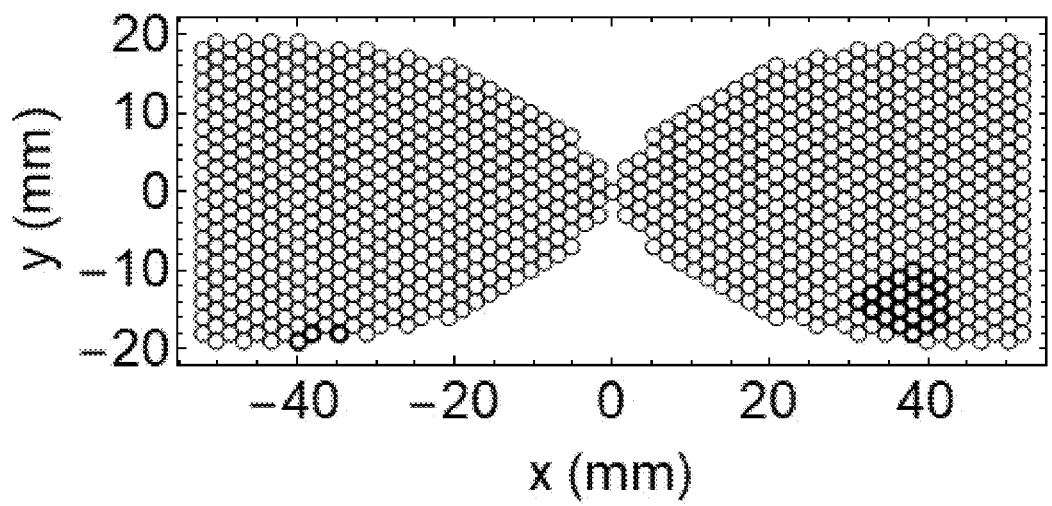
FIG. 2A shows circular columns in a flattened V1 geometry computed from an idealized mapping from retinal coordinates to cortical coordinates.
Figure 2B:
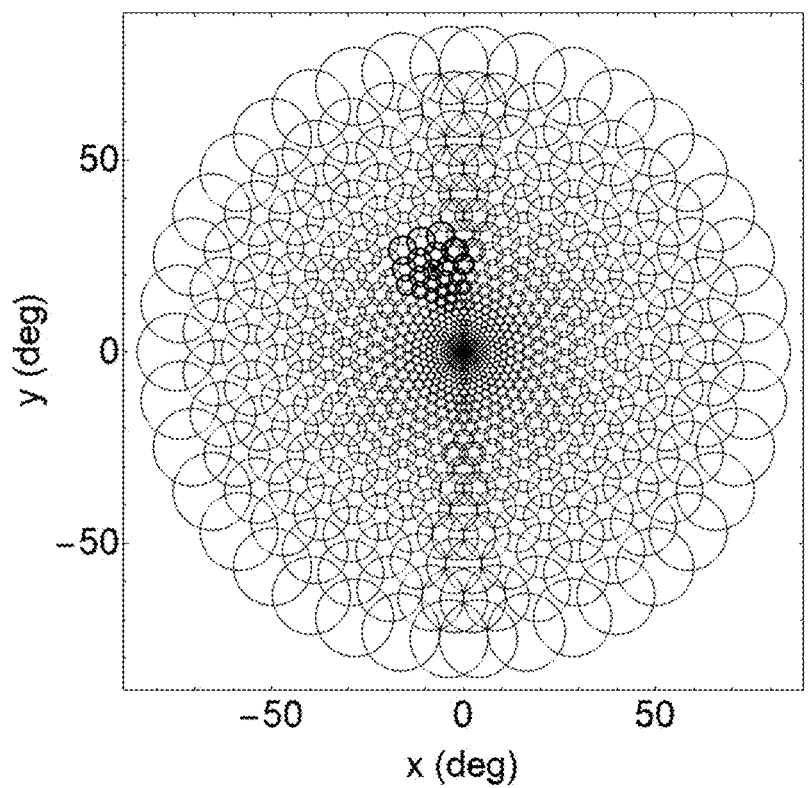
FIG. 2B shows an idealized CPV geometry constructed from the V1 geometry, wherein the darker visual regions correspond to the dark columns and are used in simulations.

FIG. 2 illustrates an idealized flattened geometry of V1 with columns depicted as circular disks and a corresponding visual geometry that results from applying equation (2) with $\gamma=12$ mm and $\varepsilon_0=1°$, values that fit the above-mentioned data obtained from the macaque monkey. Overlapping regions in the visual geometry that correspond to columns are constructed by transforming coordinates ($x_i$, $y_i$) of the center of V1 disk i to values ($\hat{\varepsilon}_i$, $\hat{a}_i$) of idealized visual geometry coordinates and assigning the value $(0.15+0.09\hat{\varepsilon}_i)^{1.2}$ to the radius of visual geometric region $\hat{R}_i$. Finally, ($\hat{\varepsilon}_1$, $\hat{a}_1$) values are converted to cartesian coordinates ($\hat{x}_i°$, $\hat{y}_i°$) which specify the center of each visual region in degrees of visual angle.

To model phosphenes, an equation comparable to equation (2) is required which characterizes the relationship of lightness values to activity in lightness channel neurons. The typically achromatic nature of phosphenes justifies the assumption that stimulation activates blue-yellow and red-green opponents approximately equally. This is a reasonable assumption given the likelihood that stimulation current produces additional action potentials at various sites on the axons of neurons across cell types and cortex layers. Furthermore, the absence of complexities such as a dependency of lightness on context in CPV suggests that phosphenes can be modeled using a functional relationship between a measure of neural activity in the lightness channels of each V1 column and visual lightness values. If $f_L(x_i, y_i, t)$ is the action potential frequency in a lightness channel neuron in column i with V1 center coordinates ($x_i$, $y_i$) at time t, then an idealized lightness value can be written as:

$$\hat{l}(\hat{x}_i°,\hat{y}_i°,t)=s_0 f_L(x_i,y_i,t)^{l_0} \quad (3)$$

It also seems likely that a range of action potential frequencies and of lightness values are produced within each column, and therefore equation (3) will be used to construct a lightness interval $\hat{\Lambda}_i(\hat{x}_i°,\hat{y}_i°,t)=[\text{Min}(\hat{l}_i(\hat{x}_i°,\hat{y}_i°,t)), \text{Max}(\hat{l}_i(\hat{x}_i°,\hat{y}_i°,t))]$ on each $\hat{R}_i$ from different values of $f_L$ in lightness channel neurons. The resulting network-wide lightness interval distribution pattern is described by order parameters $s_0$ and $l_0$.

Until sufficient data become available the theory will remain agnostic with respect to whether the visual geometry and lightness interval distribution result from interactions between populations of neurons or between single neurons. Because the latter case is much simpler to implement in computer simulations and an ENN, synaptic interactions between single neurons are presented hereinbelow.

B. Synaptic Interactions in Cortical Prosthetic Vision

Sense element engagement theory posits a geometric (G) system of synaptic interactions in a V1 network that is responsible for a CPV geometry pattern in SXT. When a stable network-wide visual geometry pattern is present, each active G system interaction engages an element of the pattern that is modeled as a set of vectors of the same magnitude that begin in a visual geometric region and terminate in the same or in a different visual geometric region, the presynaptic neuron engages the region in which these vectors begin, and the postsynaptic neuron engages the region in which the vectors terminate. The strength of G system synaptic interactions is a mathematical function of the magnitude of the geometric vectors. Interacting neurons in the same cortical column engage almost identical regions, neurons in adjacent columns engage overlapping regions, and regions grow with eccentricity in a manner that is consistent with the magnification factor of V1.

There are multiple G system synapses from each presynaptic neuron to each postsynaptic neuron and the interactions produced by these synapses vary in strength. When a stable pattern is present the collection of interactions from a given presynaptic neuron to a given postsynaptic neuron engages a collection of sets of geometric vectors, the vectors in each set having a different magnitude. The sets of vectors are such that each point in the presynaptic visual geometric region is related spatially to one or more points in the postsynaptic visual geometric region, and by symmetry each point in the postsynaptic visual geometric region is related spatially to one or more points in the presynaptic visual geometric region. The entire collection of geometric vectors between a presynaptic region and a postsynaptic region models the fuzzy (i.e., not point-to-point) qualities of visual distance and direction within the visual geometry.

The theory also includes G system synapses between a head representation network that most likely are located in the primary somatosensory cortex (S1) and the V1 network. Synaptic connections between S1 and V1 have been identified and evidence has been provided for cross-modal influences. G system synapses between S1 and V1 account for the subjective orientation of the visual geometry with respect to geometric regions of the head. Modulation of G system synaptic strengths accounts for changes in synaptic strengths that accord with changes in visual distance from the head to phosphenes on the visual geometry as would be expected to result from changes in vergence and with correlated changes in the sizes of regions that are occupied by phosphenes.

A lightness (L) system of synapses between the same neurons that interact via G system synapses produces a lightness interval distribution on the geometry in SXT. When a stable macroscopic lightness interval distribution is present, each active L system synaptic interaction engages a set of scalar lightness differences of the same magnitude. Each of the interacting neurons engages a lightness interval. The strength of interaction is a function of the absolute value of the difference between pairs of values in the presynaptic and postsynaptic intervals. Modulation of L system synaptic strengths accounts for changes in synaptic strengths that accord with changes in the distribution of lightness intervals on the visual geometry.

There are multiple L system synapses from each presynaptic neuron to each postsynaptic neuron and the interactions produced by these synapses vary in strength. When a stable lightness interval distribution is present, the collection of interactions from a given presynaptic neuron to a given postsynaptic neuron engages a collection of elements of the lightness interval distribution pattern that is modeled as a collection of sets of scalar differences, the differences in each set having a different magnitude. The sets of differences are such that each value in the presynaptic scalar interval is related by a difference to one or more values in the postsynaptic scalar interval, and by symmetry each value in the postsynaptic scalar interval is also related to one or more values in the presynaptic scalar interval. The entire collection of scalar differences between a presynaptic interval and a postsynaptic interval models the fuzzy quality of difference in lightness between geometric regions.

Although details of how pattern identification or recognition and behavioral report occur are beyond the scope of the present theory, the fact that implant recipients are aware of what a lightness interval distribution pattern represents (e.g., the identity of an uppercase letter) should be noted. In particular, this phenomenon implies that output of the V1 network results in interactions within neural networks beyond V1 which generate SXT patterns the XT projections of which constitute awareness of what a lightness interval distribution pattern represents. Furthermore, this can be communicated behaviorally.

C. Self-Organization of the Visual Geometry and the Lightness Interval Distribution Patterns The operational approach to understanding pattern formation in complex biological systems is utilized to explain how CPV patterns are thought to arise. Proposals regarding self-organization of these patterns are illustrated herein using small-scale neural network simulations.

Although the visual geometry is characterized by two order parameters, equation (2) shows that very small positive values of $\varepsilon_0$ result in small values of eccentricity $\hat{\varepsilon}$ for which the visual geometry itself vanishes. Variations in $\varepsilon_0(t)$ are dependent on the value of a potential function $V_G(\varepsilon_0)$ as indicated by:

$$\frac{d\varepsilon_0}{dt} = -\frac{dV_G}{d\varepsilon_0} + noise_G. \tag{4}$$

The functional dependency of $V_G$ on $\varepsilon_0$ describes the stable macroscopic state that results from a pattern of continuously active synaptic interactions within and between V1 columns. This dependency also involves a control parameter. Specifically, there must be sufficient general excitation of V1 produced by action potentials which originate outside of V1 for the visual geometry to persist in the absence of electrical stimulation. As the frequency of these action potentials is increased, solutions to the equations describing the dynamics of neuron membrane potentials and action potential generation also change. At a critical point, the solutions change discontinuously, and a stable visual geometry pattern appears.

Although $V_G(\varepsilon_0)$ is not known for the V1 network, a potential function can be introduced for a simulated neural network. The function previously advanced to describe the dynamics of perceptual speech categorization is modified to fit the present case as:

$$V_G(\varepsilon_0) = k\varepsilon_0 - \frac{(\varepsilon_0 + 1)^2}{2} + \frac{(\varepsilon_0 + .145)^4}{4}. \tag{5}$$

The potential landscape varies as a function of the value of k as shown in FIG. 3. For k=1.5, $\varepsilon_0 \cong 0$ and a visual geometry pattern does not exist. For k=1, $V_G(\varepsilon_0)$ is relatively flat and a minimum value moving toward $\varepsilon_0=1$ develops. Setting k=0.5 yields a minimum within the interval $0.9996<\varepsilon_0<1$. The inventor proposes that k is a monotonically decreasing function of the frequency of extrinsically generated action potentials which have an excitatory effect on excitatory neurons in the neural network and that this frequency is a control parameter for emergence of the visual geometry pattern.

Sense element engagement theory asserts that visual regions and sets of vectors within and between visual regions arise through a dependence of G system strengths of interaction on a variable that behaves like visual distance. Such variables will be written without hats (e.g., $x_i^\circ$ instead of $\hat{x}_i^\circ$) to distinguish them from visual qualities. A mapping that governs G system synaptic strengths in simulations can be constructed by introducing a set of variable values on which the strengths of G system synapses depend. Suppose that $\vec{\rho}_i=(x_i^\circ,y_i^\circ)\in R_i$ and $\vec{\rho}_j=(x_j^\circ,y_j^\circ)\in R_j$. We form a set $d_{i,j}=\{d_{i,j,1},\ldots,d_{i,j,\alpha},\ldots,d_{i,j,N}\}$ of values that mimic visual distances between points in regions $R_i$ and $R_j$. The values are chosen so that for each point in the presynaptic region $\vec{\rho}_i \in R_i$ there exists at least one point in the postsynaptic region $\vec{\rho}_j \in R_j$ such that $\|\vec{\rho}_j - \vec{\rho}_i\| = d_{i,j,\alpha}$ for some $d_{i,j,\alpha} \in d_{i,j}$. Because of symmetry, it follows that for each point in the postsynaptic region $\vec{\rho}_j \in R_j$ there exists at least one point in the presynaptic region $\vec{\rho}_i \in R_i$ such that $\|\vec{\rho}_j - \vec{\rho}_i\| = d_{i,j,\alpha}$ for some $d_{i,j,\alpha} \in d_{i,j}$. The $d_{i,j,\alpha}$ will then be used to determine target values of individual synaptic strengths $G_{i,j,\alpha}$ from each presynaptic neuron assigned to the column corresponding to region $R_i$ to each postsynaptic neuron in the column corresponding to region $R_j$. For example, a piecewise function that is linear up to a maximum value $(d_{i,j})_M$ can be used to construct a simple mapping from the set of scalar variable values to the set of synaptic strengths that applies to all pairs of interacting neurons:

$$G_{i,j,\alpha} = \begin{cases} G_M - \dfrac{G_M}{(d_{i,j})_M} d_{i,j,\alpha}, & d_{i,j,\alpha} \leq (d_{i,j})_M \\ 0, & d_{i,j,\alpha} > (d_{i,j})_M \end{cases} \quad (6)$$

where $G_M$ is the maximum synaptic strength at $d_{i,j,\alpha}=0$.

Equation (3) shows that the lightness interval distribution vanishes for very small values of so. Using again the potential function previously advanced, we can state that variations in $s_0(t)$ are dependent on the value of a potential function $V_L(s_0)$ as indicated by:

$$\frac{ds_0}{dt} = -\frac{dV_L}{ds_0} + noise_L \quad (7)$$

and for purposes of simulations describe the dependence of $V_L$ on $s_0$ as:

$$V_L(s_0) = ks_0 - \frac{(s_0+1)^2}{2} + \frac{(s_0+.145)^4}{4}. \quad (8)$$

The theory asserts that lightness intervals and sets of lightness differences emerge via a dependence of L system synaptic strengths on a variable that behaves like a difference in lightness values. The first step in constructing a mapping that governs L synaptic strengths in simulations involves using action potential frequencies in lightness channels to create variable values that behave according to equation (3). Suppose that there are p lightness channel neurons in each column and define an interval of values $\Lambda_i(x_i, y_i, t) = [\text{Min}(l_i(x_i, y_i, t)), \text{Max}(l_i(x_i, y_i, t))]$ which approximate lightness values using the minimum and maximum frequencies of action potentials in lightness channel neurons located in column i with center coordinates $(x_i, y_i)$. A pair of neurons located in columns i and j that interact via L system synapses will be assigned intervals $\Lambda_i(x_i, y_i, t)$ and $\Lambda_j(x_j, y_j, t)$. We form a set of values $|\delta l_{i,j}|(t) = \{|\delta l_{i,j,1}|(t), \ldots, |\delta l_{i,j,\beta}|(t) \ldots, |\delta l_{i,j,K}|(t)\}$ that mimic absolute differences in lightness between the lightness intervals that are to be engaged by neurons that interact via L system synapses at time t. The values can be chosen so that for each value in the presynaptic interval $l_i(x_i, y_i, t) \in \Lambda_i(x_i, y_i, t)$ there exists at least one value in the postsynaptic interval $l_j(x_j, y_j, t) \in \Lambda_j(x_j, y_j, t)$ such that $|l_j(x_j, y_j, t) - l_i(x_i, y_i, t)| = |\delta l_{i,j,\beta}|(t)$ for some $|\delta l_{i,j,\beta}|(t) \in |\delta l_{i,j}|(t)$. It follows by symmetry that for each value in the postsynaptic interval $l_j(x_j, y_j, t) \in \Lambda_j(t)$ there exists at least one value in the presynaptic interval $l_i(x_i, y_i, t) \in \Lambda_i(t)$ such that $|l_j(x_j, y_j, t) - l_i(x_i, y_i, t)| = |\delta l_{i,j,\beta}|(t)$ for some $|\delta l_{i,j,\beta}|(t) \in |\delta l_{i,j}|(t)$. The $|\delta l_{i,j,\beta}|(t)$ values will then be used to determine target values of individual synaptic strengths $L_{i,j,\beta}(t)$. As was done for the G system, a mapping for which synaptic strength decreases linearly with the value of the scalar variable $|\delta l_{i,j,\beta}|(t)$ up to a maximum value $|\delta l_{i,j}|_M$ ensures reasonable variation in $L_{i,j,\beta}(t)$ values over the entire range of absolute differences:

$$L_{i,j,\beta} = \begin{cases} L_M - \dfrac{L_M}{|\delta l_{i,j}|_M} |\delta l_{i,j,\beta}|, & |\delta l_{i,j,\beta}| \leq |\delta l_{i,j}|_M \\ 0, & |\delta l_{i,j,\beta}| > |\delta l_{i,j}|_M \end{cases} \quad (9)$$

where $L_M$ is the maximum synaptic strength at $|\delta l_{i,j,\beta}|(t)=0$.

In the V1 network, the counterparts of $G_M$, $d_{i,j,\alpha}$, $(d_{i,j})_M$, $L_M$, $|\delta l_{i,j,\beta}|$, and $|\delta l_{i,j}|_M$ are proposed to be important determinants of the strengths of interaction and to result from visual developmental processes. Close relationships between $(d_{i,j})_M$ and $\varepsilon_0$, between $|\delta l_{i,j}|_M$ and $s_0$, between $d_{i,j,\alpha}$ and visual distances $\hat{d}_{i,j,\alpha}$, and between $|\delta l_{i,j,\beta}|$ and differences in visual lightness $|\delta \hat{l}_{i,j,\beta}|$ are to be expected.

To quantify the goodness of fit between $(d_{i,j})_M$ and $\varepsilon_0$, a visual geometry was constructed using each of 21 equally spaced values of $\varepsilon_0$ ranging from 0.95 to 1.05. In each geometry, the 7 regions having the smallest center-to-center Euclidean distances from each region were found and defined as nearest neighbors (nn) of that region. The maximum distance between each pair of nn regions was computed and $(d_{i,j})_M$ was set equal to the largest maximum value (center-to-center distance plus the sum of the radii of each region) for each geometry. The value of $\gamma$ was held constant at 12 mm. The intercept and slope parameters of the best fit linear model $(d_{i,j})_M = -3.21345 + 42.4337 \, \varepsilon_0$ have standard errors less than 0.0133 and a computed estimate of $R^2=0.99999$.

The constant and slope parameters for the linear model that best fits values of $s_0$ and $|\delta l_{i,j,\beta}|_M$ depend on details of the simulated electrical stimulation of lightness channel neurons. Using values of $s_0$ ranging from 0.95 to 1.05 and with $l_0=1$, lightness intervals were computed on visual region 298 displayed in FIG. 2 with a point at center coordinates $(-7.9354°, 21.5206°)$ and enlarged in FIG. 4. Firing rates of lightness channel neurons in the column corresponding to this region were uniformly distributed from 90/s to 100/s, and firing rates were uniformly distributed from 10/s to 20/s on all other, non-stimulated regions. The intercept and slope parameters of the best fit linear model $|\delta l_{i,j,\beta}|_M = 34.9452 + 0.184895 \, s_0$ have standard errors less than $7.3 \times 10^{-15}$ and the computed estimate of $R^2=1$ as expected given that $l_0=1$.

The close relationships between $(d_{i,j})_M$ and $\varepsilon_0$=and between $|\delta l_{i,j,\beta}|_M$ and $s_0$ imply that the potential functions that characterize the size of the emergent visual geometry and the maximum contrast in the lightness interval distribution can arise by virtue of the neural network variables $(d_{i,j})_M(t)$ and $|\delta l_{i,j}|_M$. If we use equation (6) to write G as a function of visual distance $\hat{d}_{i,j,\alpha}$ and substitute the appropriate function of $\varepsilon_0$ for $(d_{i,j})_M$, the result describes a mapping $X \to S$. Similarly, by substituting the appropriate function of $s_0$ for $|\delta l_{i,j}|_M$, we can use equation (9) to express L as a function of absolute difference in lightness $|\delta \hat{l}_{i,j,\beta}|$. Sense element engagement theory proposes that this is possible for values of the control parameter for which G and L system synaptic interactions become continuously active within and between all columns.

D. Small-Scale Neural Network Simulations Behave in Accordance with Sense Element Engagement Theory (1) Simulation Methods Simulations of a neural network comprised of spiking integrate-and-fire neurons interacting via conductance-based synapses illustrate key elements of the theory. A timestep of 0.05 ms is used in all simulations. Membrane potentials are estimated using a second order Runge-Kutta approximation supplemented with linear interpolation of spike times. Details are provided in the Examples section hereinbelow.

Simulations employed 4 excitatory and 2 inhibitory neurons in each of 25 columns of V1 which correspond to the 25 visual geometry regions depicted as black circles in FIG. 2 and shown with region numbers in FIG. 4. The 7 nn of core region 298 were found. The 7 nn of each of these regions were then found, yielding a total of 25 regions. Finally, the 7 nn of each of the remaining 17 regions were found, but only those regions that are members of the original set of 25 were retained. The resulting nn of each region are listed in Table I. Each excitatory neuron and each inhibitory neuron in each of the 25 regions received input from each excitatory neuron in its nn regions (including neurons in its own region other than itself) via $n_e$ synapses, and from each inhibitory neuron in its nn regions (including the other inhibitory neuron in its own region) via $n_i$ synapses.

TABLE I

SIMULATION VISUAL REGIONS

| Region | Nearest Neighbors | | | | | | |
|---|---|---|---|---|---|---|---|
| 298 | 265 | 262 | 297 | 301 | 300 | 303 | 260 |
| 265 | 263 | 260 | 266 | 262 | 298 | 301 | 228 |
| 262 | 260 | 259 | 261 | 265 | 297 | 298 | 727 |
| 297 | 262 | 261 | 295 | 298 | 299 | 764 | 300 |
| 301 | 266 | 265 | 302 | 298 | 303 | 304 | 263 |
| 300 | 298 | 297 | 299 | 303 | 336 | 337 | 765 |
| 303 | 301 | 298 | 300 | 304 | 337 | 340 | 265 |
| 260 | 228 | 225 | 263 | 259 | 262 | 265 | 223 |
| 263 | 228 | 260 | 265 | 266 | | | |
| 266 | 263 | 265 | 301 | 302 | | | |
| 228 | 223 | 225 | 260 | 263 | | | |
| 259 | 727 | 225 | 260 | 261 | 262 | | |
| 261 | 727 | 259 | 262 | 295 | 764 | | |
| 727 | 259 | 261 | | | | | |
| 295 | 764 | 261 | 297 | 765 | | | |
| 299 | 765 | 297 | 295 | 764 | 300 | | |
| 764 | 295 | 261 | 765 | 297 | | | |
| 302 | 266 | 301 | 304 | | | | |
| 304 | 302 | 301 | 303 | 340 | 266 | | |
| 336 | 300 | 299 | 337 | 765 | | | |
| 337 | 303 | 300 | 340 | 336 | 298 | | |
| 765 | 299 | 295 | 764 | 297 | | | |
| 340 | 304 | 303 | 337 | 301 | | | |
| 225 | 223 | 228 | 259 | 260 | | | |
| 223 | 225 | 228 | | | | | |

Synaptic strengths were assigned based on values of the variables $G_M$, $d_{i,j,\alpha}$, $(d_{i,j})_M$, $L_M$, $|\delta l_{i,j,\beta}|$, and $|\delta l_{i,j,\beta}|_M$. Initial values of both $\varepsilon_0$ and $s_0$ were chosen from a uniformly distributed random variable, U[0.99, 1.01]. On each timestep, the value was updated using the following Euler approximation to equations (4) and (7):

$$x_0(t+\Delta t)=k-(x_0(t)+1)+(x_0(t)+0.145)^3\Delta t+U[-0.001, 0.001] \quad (10)$$

where $x_0$ refers to either $\varepsilon_0$ or $s_0$, and k=0.5. A Gaussian filter with a Gaussian kernel having radius equal to 100 was applied to each time series. The best fit linear models found in the previous section were employed to calculate values of $(d_{i,j})_M(t)$ and of $|\delta l_{i,j,\beta}|_M(t)$ from $\varepsilon_0(t)$ and $s_0(t)$.

To set values of G system synaptic strengths, the mean distance between each pair of regions $\langle d_i \rangle$ (t) for each value of $\varepsilon_0(t)$ was found. A set of $n_e(n_i)$ values for distance variables $d_{i,j,\alpha}$ that are uniformly distributed in the interval $0.9 \langle d_i \rangle (t) < d_{i,j,\alpha}(t) < 1.1 \langle d_i \rangle (t)$ was then constructed for excitatory (inhibitory) neurons. Strengths for each update of the simulation were then calculated using equation (6).

Figure 5:
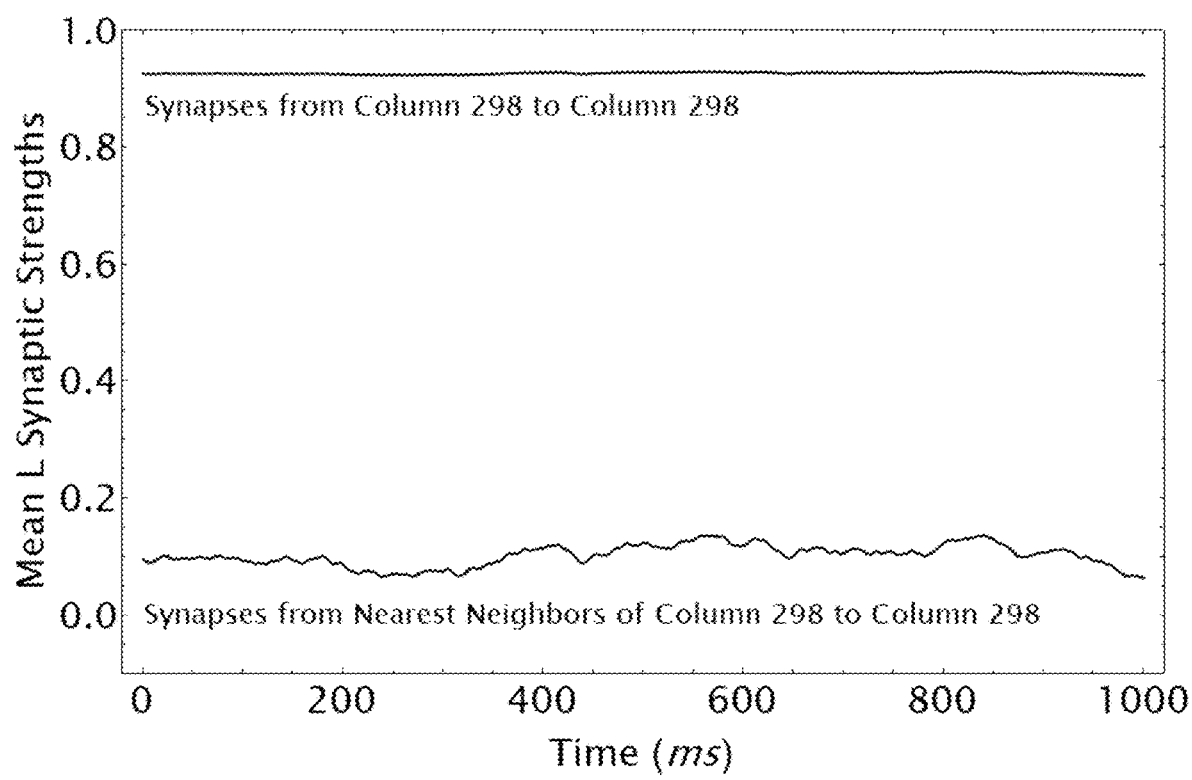
FIG. 5 shows mean L system synaptic strengths to neurons in stimulated column 298 from neurons in column 298 and in nearest neighbor columns.

The same process was employed to determine L system synaptic strengths. In this case, the value of $|\delta l_{i,j,\beta}|_M$ depends on the column(s) receiving simulated stimulation and the desired effects of stimulation on lightness channel neurons. Firing rates of lightness channel neurons that are uniformly distributed from 90/s to 100/s in a stimulated column, and firing rates uniformly distributed from 10/s to 20/s in non-stimulated columns were assumed and (3) was used to calculate lightness values. The mean absolute difference $\langle |\delta l_{i,j}| \rangle$ (t) between each pair of near-neighbor regions was found for each value of $s_0(t)$ and a set of $n_e$ ($n_i$) values for absolute differences in variables $|\delta l_{i,j,\beta}|(t)$ that are uniformly distributed in the interval $0.9 \langle |\delta l_{i,j}| \rangle (t) < |\delta l_{i,j,\beta}|(t) < 1.1 \langle |\delta l_{i,j}| \rangle (t)$ was constructed for excitatory (inhibitory) neurons. Strengths for each update of the simulation were then computed using (9). An example of the resulting variation in mean L system strength among column 298 (which corresponds to visual region 298) neurons receiving simulated stimulation and of the variation in mean strength from neurons in nearest neighbor columns is shown in FIG. 5.

Simulated excitatory action potential input (i.e., the putative control parameter) was delivered only to excitatory network neurons. To avoid synchronous input to neurons in all columns, a spike train was generated independently for each of the 100 excitatory neurons, and each spike train activated 25 synapses for each neuron. The algorithm that was used for generating spike trains is described in the appendix. This same algorithm was used for adding additional spike times to both excitatory and inhibitory neurons to simulate the effects of electrical stimulation. Independent spike trains were generated for each excitatory neuron and for each inhibitory neuron to simulate the production of additional action potentials in axons having different spatial orientations and locations from a stimulating electrode. Results are reported for a case in which simulated electrical stimulation producing an additional 95 spikes per second is applied to neurons in column 298.

(2) Simulation Results

Results that are consistent with the sense element engagement theory are illustrated using simulations for which $n_e=7$ and $n_i=2$ and $g_{coeff}=0.15$. (See also Example 1 hereinbelow). To determine if extrinsically generated excitatory action potential frequency behaves as a control parameter, the proportion of columns containing neurons that produce non-zero synaptic conductance is employed as a dependent variable. This measure is used because it is assumed that continuous network-wide synaptic interactions are necessary for emergence of the visual geometry and lightness interval distribution patterns.

Figure 6A:
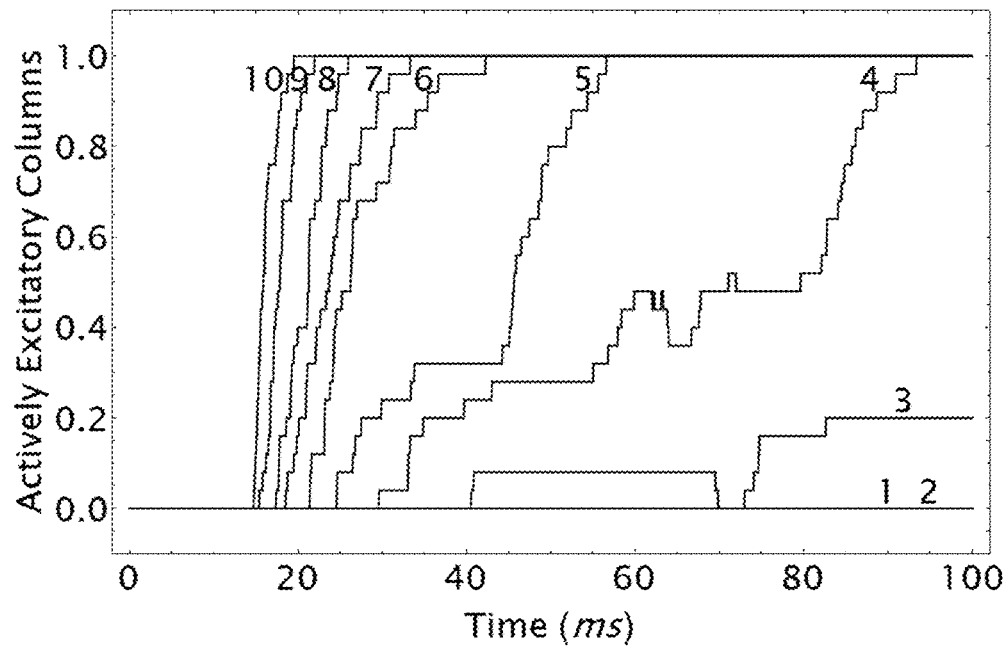
FIG. 6A shows the proportion of columns containing neurons that produce non-zero excitatory synaptic conductance for simulations of 100 ms duration during which 1 to 10 extrinsic, excitatory action potentials are delivered to the network.
Figure 6B:
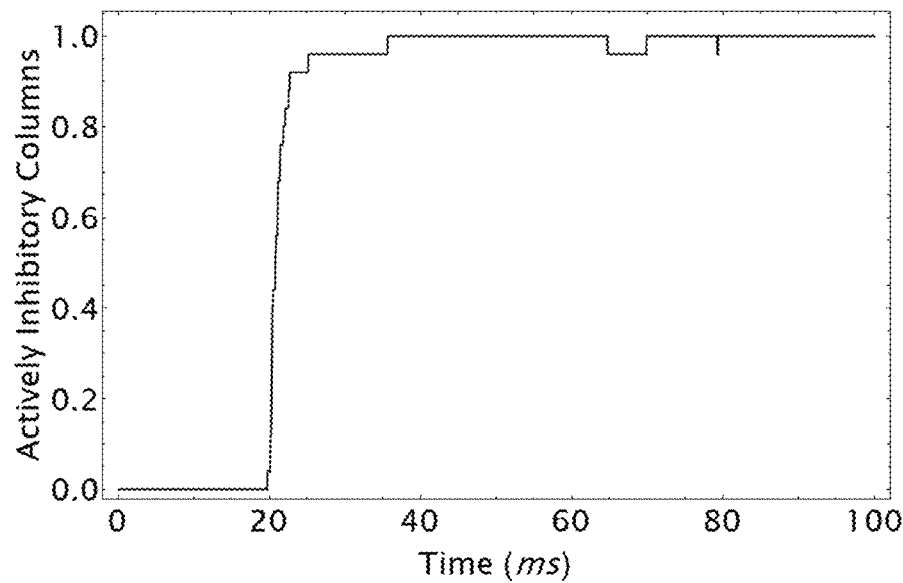
FIG. 6B shows the proportion of columns containing neurons that produce non-zero inhibitory synaptic conductance when 10 extrinsic, excitatory action potentials are delivered.

FIG. 6(A) shows the results of simulations of 100 ms duration during which 1 to 10 extrinsic excitatory action potentials stimulated excitatory neurons in each column and no columns receives simulated electrical stimulation. At least 4 excitatory action potentials are necessary for excitatory neurons in all columns to produce non-zero synaptic conductance, and as the number of action potentials increases the onset of network-wide active excitation occurs earlier. As shown in FIG. 6(B), inhibitory neurons produce network-wide non-zero synaptic conductance sporadically even when 10 extrinsic excitatory action potentials stimulate excitatory network neurons.

Figure 7:
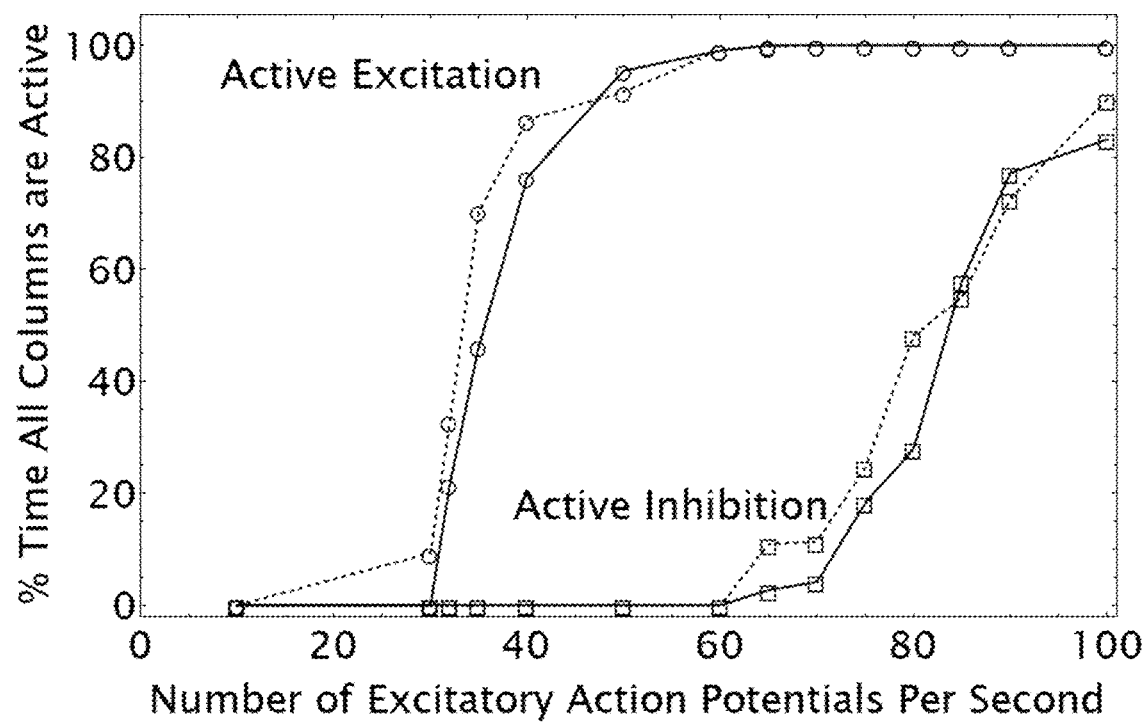
FIG. 7 shows the percentage of the final 900 ms of 1000 ms simulations during which all columns contain excitatory or inhibitory neurons which produce non-zero synaptic conductance plotted against the frequency of extrinsic excitatory action potentials in the absence (solid lines) and in the presence (dashed lines) of simulated electrical stimulation.

The percentage of the final 900 ms of 1000 ms-duration simulations during which network-wide active excitation and inhibition are present is displayed in FIG. 7. These data are displayed both in the presence (dashed lines) and absence (solid lines) of simulated electrical stimulation. The data are very similar for these two cases. As the frequency of excitatory action potentials is increased above 30/s the percentage of time during which excitatory neurons in all columns produce non-zero synaptic conductance rises rapidly, and a frequency greater than 60/s is required for network-wide excitation to be present for the final 900 ms of each simulation. It should be noted that the proportion of columns producing non-zero excitatory synaptic conductance rises very quickly for larger values of the putative control parameter. When the frequency of excitatory action potentials is 90/s, the rise from a proportion of 0.0 to a proportion of 1.0 occurs in 4.85 ms in the absence of simulated electrical stimulation. Simulated electrical stimulation produces spikes that cause an immediate increase in the proportion of continuously active columns from 0.0 to 0.08, and the increase from this value to a proportion of 1.0 occurs in 5.7 ms. The percentage of time during which all columns contain inhibitory neurons that produce non-zero synaptic conductance rises above zero only for frequencies greater than 60/s, rises more slowly, and does not reach 100% even when the frequency of excitatory action potentials is 100/s.

Figure 8A:
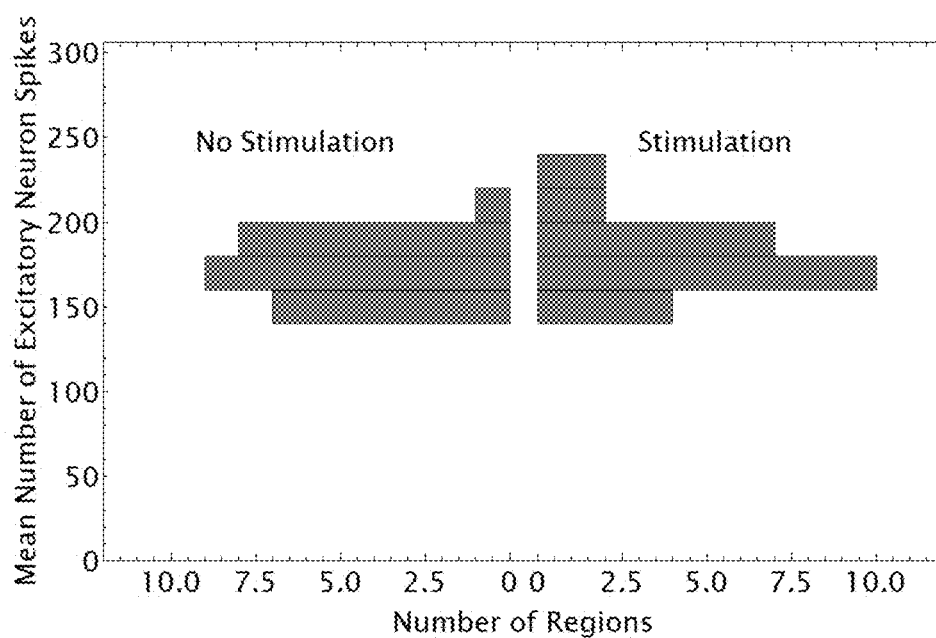
FIG. 8A shows the distribution of numbers of spikes for network excitatory neurons and FIG. 8B shows the distribution of numbers of spikes for network inhibitory neurons for a frequency of extrinsic excitatory action potentials set to 90/s and in the absence and presence of simulated stimulation of column 298 neurons. A bin width of 20 spikes is used.
Figure 8B:
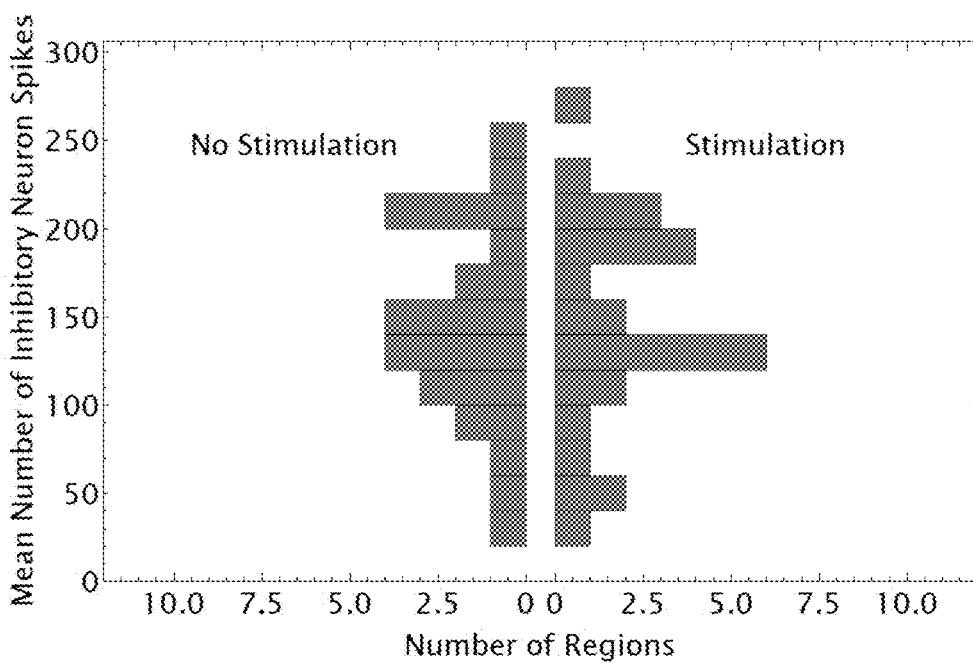

The distributions of numbers of spikes that are generated by network excitatory and inhibitory neurons are displayed in FIG. 8 for a frequency of extrinsic excitatory action potentials set to 90/s. Inhibitory neurons clearly have a much greater range of frequencies and excitatory neurons have a higher mean frequency. In the absence of stimulation, the overall mean is 172.33/s for excitatory neurons and 145.16/s for inhibitory neurons. When electrical stimulation is simulated, the overall mean is 178.85/s for excitatory neurons and 144.9/s for inhibitory neurons. The very low frequencies of spikes produced by some inhibitory neurons are consistent with the lower percentage of time during which all columns contain inhibitory neurons that produce non-zero synaptic conductance.

II. A Neural Network Strategy for Testing Sense Element Engagement Theory

Sense element engagement theory makes a number of specific assertions regarding the existence of G and L systems of synapses in V1 and the dependence of strengths of interaction on quantities that behave like visual distances and absolute differences in lightness, the existence of a general excitation control parameter characterized by a critical value at which the visual geometry and lightness interval distribution patterns emerge, the existence of order parameters that characterize the visual geometry and the lightness interval distribution patterns, and the manner in which values of the order parameters depend on values of the putative control parameter. Although testing these assertions may be challenging, they are all testable in principle. However, one particular strategy for testing predictions provided by the theory is given priority because of its potential benefits.

This strategy has the goal of constructing a device that alters the visual experiences of CPV by introducing a second visual geometry. It has been reported that implant recipients perceived continuous visual forms rather than patterns of discrete phosphenes when current steering was used to stimulate electrodes sequentially. According to sense element engagement theory, fusion of discrete phosphenes would occur if regions of the visual geometry pattern engaged by interacting neurons within stimulated columns overlapped. Furthermore, the theory specifies that altering regions requires changing G system strengths of interaction. Thus, it is probable that continuous visual forms are perceived because current steering activates visual motion circuits which in turn modulate G system synaptic strengths in a fashion that yields the required alteration of geometric regions. This probability suggests that introducing electronically mediated interactions among populations of neurons might engage additional visual geometric regions. Two different forms of additional regions are described hereinbelow.

The following considerations pertain to both forms of additional regions. It is assumed that populations in every column for which there is a corresponding electrode will be stimulated but that stimulation current that is above the threshold for producing a phosphene will be delivered through only one or a few electrodes. It is also assumed that each electrode will be used to record population activity and to stimulate on an intermittent basis. A second visual geometry is created if the following conditions hold: (1) the amplitude of each population recording in a small time-interval determines whether an artificial action potential occurs; (2) artificial action potentials activate a set of electronic synapses for each "presynaptic and postsynaptic" pair of column populations; (3) the strengths of electronic synaptic interactions decrease as a specified function of a variable that behaves like visual distance; (4) synaptic currents modulate a signal that mimics a neuron membrane potential; and (5) the amplitude of stimulation current that is delivered to each electrode is modulated by this signal.

Figure 1A:
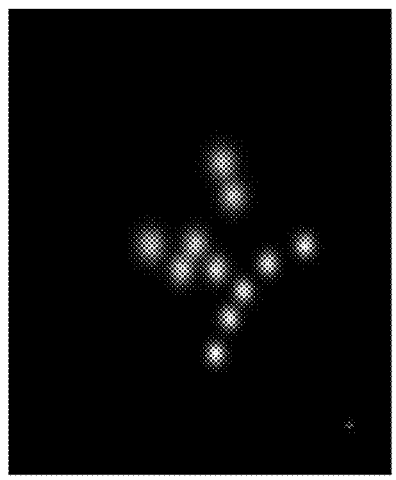
Figure 1B:
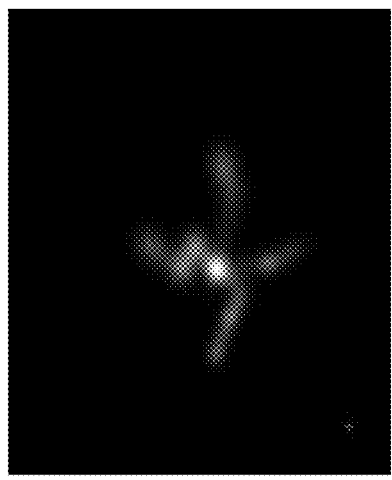

One way is to arrange the strengths of electronic synaptic interactions in order to alter the existing visual regions on which the lightness interval distribution has local maxima so that specific regions overlap. This requires that stimulation current above the threshold for producing a phosphene is delivered to each of the columns that correspond to the visual regions in which a discrete phosphene initially appears. It also requires that the extrinsic strengths of interaction are determined by a variable having values corresponding to distances among existing visual regions, among extensions to these regions that overlap, and between the overlapping extensions and the existing regions. Because lightness intervals containing high values are produced in columns that now correspond to extended, overlapping regions, a continuous visual form should result. A simulation of this possibility is shown in FIG. 1(B).

Figure 1C:
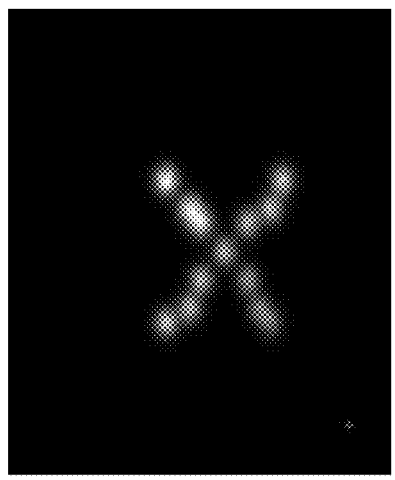

A second way is to add new regions of desired sizes and positions to a single, existing region on which a phosphene appears, which also requires intermittent stimulation of populations of neurons in all columns but requires stimulating only one column with current that is above the threshold for creating a phosphene. The visual region that corresponds to this column will be treated as an anchor for the additional regions of desired sizes and positions. In this case, the extrinsic strengths of interaction among the populations of neurons in all columns needs to be determined by visual distance-like variable values among the existing visual regions, including the anchor region, among the new, desired regions, and between the existing and new regions. This possibility is illustrated by the simulation in FIG. 1(C).

Much information is required to construct a device that meets the conditions that are required for either form of additional regions. Having an ENN that produces lightness interval distributions on a complete visual geometry in real time may provide a platform for conducting experiments that would be very useful in selecting parameter values required for the device to perform as intended. Also, it can be beneficial to begin with large-scale (and computationally expensive) neural network computer simulations to identify parameter values (e.g., number of neurons per column, ratio of excitatory to inhibitory neurons, connectivity) which are used to design the ENN.

Data provided by an ENN may provide much information that is required for the recording and stimulation system. Using the ENN as a test system on the process for producing the two forms of visual regions prior to testing on individuals with cortical implants also is advantageous with respect to ethical considerations. If research with the ENN provides results that are consistent with the existence of a second visual geometry and if subsequent research with human participants which is based on those results leads to subjective reports of the desired forms of visual regions, then it seems reasonable to consider seriously a claim that the ENN is a sentient device.

III. Progress in Development of the ENN

The first step in the development of the ENN was the use of the PyNEST interface and the NEST 2.20.0 simulator to replicate simulations of neurons in columns that correspond to visual regions shown in FIG. 2 and reported in Section ID. This software was employed because the BrainScaleS computer is an electronic neuromorphic hardware system that can be used for full-scale emulation of the neural network and prosthetic device, and this system uses the PyNEST interface to the NEST software. Although differences in details of the models that are employed in the original simulation code used in Section ID and those employed by NEST are likely to produce some quantitative differences in results, it is crucial that NEST simulations produce results that are consistent with the Sense Element Engagement theory and that they remain so as the duration of simulations is increased.

The second step is determining if results consistent with the Sense Element Engagement theory are obtained as the size of the network is scaled up and simulation duration is increased.

The third step addresses both conceptual and practical issues in development of a prosthetic device. As noted in Section I, consistency demands that the perspective on which Sense Element Engagement theory is based need to include the experience of the number of phosphenes. In particular, output of the V1 network should result in interactions beyond V1 that generate SXT patterns which include subjective awareness of the number of phosphenes and objective neural activity that is required to report that number behaviorally. The identification of a method that uses spikes produced by simulations of the V1 network neurons to report the number of phosphenes produced by simulated cortical stimulation would substantiate the assertion that this can be done by networks that receive input from the V1 network. Such a method also would be very useful in tuning parameters of the prosthetic device as the scale of simulations is increased. A study to identify and test such a method is provided in Example 2 hereinbelow.

The present invention is more particularly described in the following examples, which are intended to be illustrative only, as numerous modifications and variations therein will be apparent to those skilled in the art.

EXAMPLES

Example 1

The sub-threshold dynamic of a neuron membrane potential is:

$$\tau_m \frac{dV(t)}{dt} = -V(t) + V_{leak} - \frac{I_{tot}(t)}{g_{leak}}. \tag{A1}$$

Both excitatory and inhibitory neurons were assigned a leak membrane potential $V_{leak}=-70$ mV, a spike threshold $\theta=-52$ mV, and a reset potential $V_{reset}=-59$ mV. The leak membrane conductance $g_{leak}$ was set to 25 nS for excitatory neurons and to 20 nS for inhibitory neurons. The total current $I_{tot}(t)$ is computed using conductance values at each synapse which are given by:

$$I_{syn}(t)=g_{syn}s_{syn}(t)(V(t)-V_{syn}). \tag{A2}$$

In (A2), $g_{syn}$ is the peak conductance and $V_{syn}$ is the reversal potential of the synapse with values listed in Table AI.

TABLE AI

MODEL SYNAPSE PARAMETERS

| SYNAPTIC CONDUCTANCES, $g_{syn}$(nS) | |
|---|---|
| AMPA$_{recurrent}$ on excitatory | 0.178 |
| AMPA$_{recurrent}$ on inhibitory | 0.233 |
| AMPA$_{external}$ on excitatory | 0.234 |
| GABA on excitatory | 2.01 |
| GABA on inhibitory | 2.70 |
| SYNAPTIC REVERSAL POTENTIAL, $V_{syn}$(mV) | |
| $V_{AMPA}$ | 0 |
| $V_{GABA}$ | −80 |

The actual values of peak conductance at each synapse were obtained by multiplying $g_{syn}$ by a coefficient $0<g_{coeff}<1$. This additional step was included so that the number of synapses from each presynaptic neuron to each postsynaptic neuron can be made large enough to provide a range of strengths that depend on values of variables that behave like visual distance and absolute difference in lightness. The synaptic function $s_{syn}(t)$ yields the time course of conductance as a difference of exponentials. When the spike threshold $\theta$ is exceeded producing an action potential at time t*, the value of $s_{syn}(t)$ is incremented by:

$$\Delta s_{syn}(t) = \frac{\tau_m}{\tau_d - \tau_r}\left[\exp\left(-\frac{t-\tau_l-t^*}{\tau_d}\right) - \exp\left(-\frac{t-\tau_l-t^*}{\tau_r}\right)\right] \tag{A3}$$

and the value of the membrane potential is set to $V_{reset}$. Values of the latency $\tau_l$, rise time $\tau_r$ and decay time id are provided in Table AII. Excitatory neurons were assigned an absolute refractory period of 2 ms and inhibitory neurons were assigned an absolute refractory period of 1 ms.

TABLE AII

VALUES OF SYNAPTIC TIME CONSTANTS

| SYNAPTIC TIME CONSTANTS (ms) | $\tau_l$ | $\tau_r$ | $\tau_d$ |
| --- | --- | --- | --- |
| AMPA on excitatory | 1 | 0.4 | 2 |
| AMPA on inhibitory | 1 | 0.2 | 1 |
| GABA | 1 | 0.25 | 5 |

Membrane potentials between spikes were computed using a Runge-Kutta approximation to a Taylor Series expansion that gives second-order accuracy in the discrete timestep $\Delta t$, supplemented by linear interpolation of times $t^*$ with subsequent refinement of values $V_i(t+\Delta t)$. The Runge-Kutta approximation is given by:

$$V(t+\Delta t) = V(t) + \frac{1}{2}(a_1 + a_2), \quad (A4)$$

$$a_1 = \frac{\Delta t}{\tau_m}\left[-V(t) + v_{leak} - \frac{I_{tot}(t)}{g_{leak}}\right],$$

$$a_2 = \frac{\Delta t}{\tau_m}\left[-V(t) + a_1 + V_{leak} - \frac{I_{tot}(t+\Delta t)}{g_{leak}}\right],$$

in which computation of total conductance $I_{tot}(t+\Delta t)$ is done assuming that no spike occurs between $t$ and $t+\Delta t$.

The inclusion of absolute refractory periods in simulations requires that the interpolation of values $t^*$ be calculated in three different ways. The occurrence of the first spike is inferred at the first occurrence of $V(t)<\theta$ and $V(t+\Delta t)\geq\theta$ so that $t<t^*<t+\Delta t$. Using the interpolation described in [45], the value of $t^*$ is approximated as:

$$t^* = t + \Delta t \frac{\theta - V(t)}{V_o(t+\Delta t) - V(t)}. \quad (A5)$$

In this equation, $V_o(t+\Delta t)\geq\theta$ denotes the value of the membrane potential at time $t+\Delta t$ that has already been computed. Given that $V(t^*)=V_{reset}$, the approximation $$\frac{dV(t^*)}{dt} = \frac{V_o(t+\Delta t) - V(t)}{\Delta t} + \frac{1}{\tau_m}[V(t) - V_{reset}] \quad (A6)$$

and (A5) are then used to calculate a more accurate estimate of $V(t+\Delta t)$:

$$V(t+\Delta t) = V_{reset} + (t+\Delta t - t^*)dV(t^*)/dt \quad (A7)$$

Equation (A7) can also be used in the case for which at least one spike has occurred, $(t+\Delta t)\geq\theta$, and $V(t)<\theta$ for $t\geq t_{last}^*+arp$, where $t_{last}^*$ stands for the time of the last action potential and arp denotes the absolute refractory period of the neuron.

Two other cases are possible. For each of these at least one spike has already occurred and $0\leq(t+\Delta t)-(t_{last}^*+arp)\leq\Delta t$. In one case $V(t)\geq\theta$, which forces $t^*=t_{last}^*+arp$. It follows from the right-hand side of (A7) that $$V(t+\Delta t) = V_{reset} + \left(t + \Delta t - (t_{last}^* + arp)\frac{dV(t^*)}{dt}\right). \quad (A8)$$

The other possibility is that $V(t)<\theta$ so that $$t^* = t_{last}^* + arp + ((t+\Delta t) - (t_{last}^* + arp))\frac{\theta - V(t)}{V_o(t+\Delta t) - V(t)}. \quad (A9)$$

Substitution of (A6) and (A9) into (A7) yields the desired estimate of $V(t+\Delta t)$.

In constructing the simulations, the control parameter for the visual geometry pattern was considered to be the number of excitatory action potentials delivered to excitatory neurons within the network in a given period of time. It therefore was decided that the algorithm employed to generate excitatory action potentials from outside of the network should create an exact number of action potentials for any specified duration of the simulation.

It was assumed that the duration of the simulation is d ms. Each excitatory network neuron has an absolute refractory period of 2 ms and it also was assumed that N is the desired number of spikes. Each spike then occupies 2 ms and therefore each spike must occur within a spike interval $s=(d-2N)/N$ ms. If the probability distribution of spike time within an interval s is uniform, then the time of the first spike $t_1=U[0,s]$, $t_2=U[s+arp, 2s+arp]$, and in general $t_i=U[(i-1)(s+arp)$, is $+(i-1)arp]$ for $i=1, \ldots, N$ where U is a value drawn from a uniform distribution over the specified interval. Each time series of action potentials that was generated in this way excited excitatory network neurons in a simulated V1 column corresponding to a visual geometric region.

Example 2

A. Simulation Methods

Neural network simulations using NEST 2.20.0 with a timestep of 0.05 ms running on Virtual Box lubuntu 18.04 followed the format of the simulations reported in Section ID, but the duration of simulations was increased from 1 s to 10 s. Spiking neurons were simulated using the simple conductance based leaky integrate-and-fire neuron model with static synapses and resting potential −70 mV, membrane capacitance 250 pF, a refractory period of 2 ms for excitatory neurons and 1 ms for inhibitory neurons, threshold potential −52 mV, reset potential −59 mV, a rise time of the excitatory synaptic conductance alpha function equal to 0.4 ms and a rise time of the inhibitory conductance function equal to 0.2 ms. It should be noted that the NEST neuron model and the synaptic function differ from the models used in Section ID and are expected to produce results that differ slightly from simulations that are reported in that section. However, it seems reasonable to demand that the qualitative behavior of the proposed V1 network should be robust to such differences.

Figure 9A:
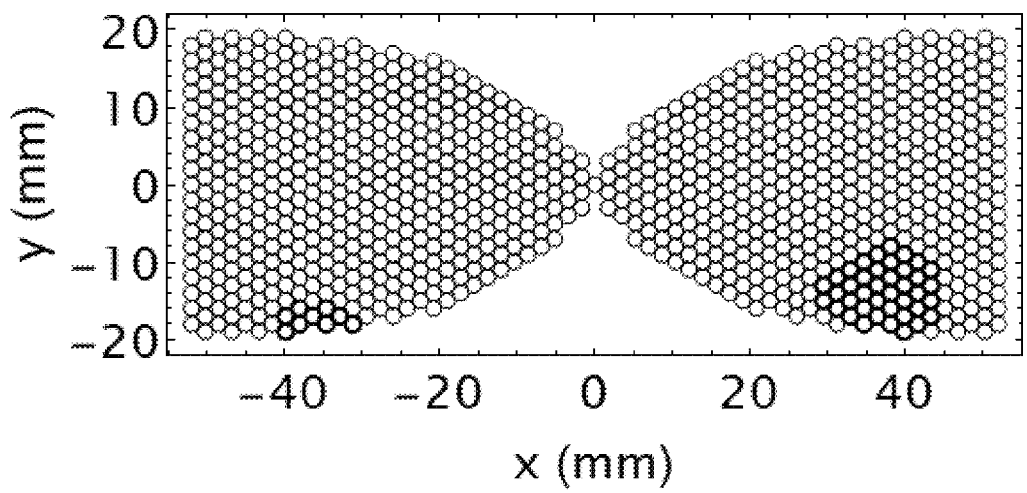
FIG. 9A shows the same cortical columns in a flattened V1 geometry as FIG. 2A

Four excitatory and two inhibitory neurons populated each simulated V1 column corresponding to a visual region. Simulations of networks spanning the 25 darkened columns in FIG. 2 and the 49 darkened columns in FIG. 9 were conducted. In both cases, the 7 regions having the smallest center-to-center visual distances from each of the 939 regions were found and defined as nearest neighbors (nn) of that region. The region numbered 298 with center coordinates (−7.9358°, 21.5206°) was arbitrarily identified as the core region of the simulation as in Section I D. and renumbered as region 1 as shown in FIG. 10. The 7 nn of region 1 were first identified and numbered 2-8. The 7 nn of each of regions 2-8 were then identified and numbered 9-25. To simulate the neurons in the corresponding columns, the 7 nn of regions 9-25 were identified but only those regions that are members of the original set of 25 were retained. In simulations of 49 regions, all 7 nn of regions 9-25 were retained and the 24 regions not contained in the original set of 25 were numbered 26-49. The 7 nn of these 24 regions were identified, but only those regions that are members of the original set of 49 were retained. The identities of all regions are provided in Table II, with the nn of the initial set of 25 shown in boldface type.

Each excitatory neuron and each inhibitory neuron in each of the columns corresponding to the simulated regions received input from each excitatory neuron in its nn columns (including neurons in its own column other than itself) via $n_e=7$ synapses, and from each inhibitory neuron in its nn columns (including the inhibitory neuron in its own column other than itself) via $n_i=2$ synapses. Synaptic strengths were determined using the maximum visual distance $(d_{i,j})_M$ between regions and the maximum difference in lightness between regions $|\delta l_{i,j,\beta}|_M$ under the assumption that order parameters $\varepsilon_0=s_0=1$. This procedure was chosen over the strategy described in Section ID of allowing the order parameters to vary according to potential functions (described by equations (4), (5), (7), and (8) in Section IB) in order to speed up simulations. G system synaptic strengths were assigned using equation (6) with maximum strength $G_M=1$, maximum distance $(d_{i,j})_M=39.2183$ between two points in nn regions within the entire set of 939 regions, $d_{i,j}$ a specific distance between a point in column i containing the presynaptic neuron and a point in region j containing the postsynaptic neuron, and a identifying the synapse.

TABLE II

SIMULATION VISUAL REGIONS

| Region | Nearest Neighbors | | | | | | |
|---|---|---|---|---|---|---|---|
| 1 | 2 | 3 | 4 | 5 | 6 | 7 | 8 |
| 2 | 9 | 8 | 10 | 3 | 1 | 5 | 11 |
| 3 | 8 | 12 | 13 | 2 | 4 | 1 | 14 |
| 4 | 3 | 13 | 15 | 1 | 16 | 17 | 6 |
| 5 | 10 | 2 | 18 | 1 | 7 | 19 | 9 |
| 6 | 1 | 4 | 16 | 7 | 20 | 21 | 22 |
| 7 | 5 | 1 | 6 | 19 | 21 | 23 | 2 |
| 8 | 11 | 24 | 9 | 12 | 3 | 2 | 25 |
| 9 | 26 | 11 | 8 | 27 | 2 | 10 | 28 |
| 10 | 27 | 9 | 29 | 2 | 5 | 18 | 26 |
| 11 | 28 | 25 | 26 | 24 | 8 | 9 | 30 |
| 12 | 14 | 24 | 31 | 32 | 8 | 13 | 3 |
| 13 | 14 | 12 | 33 | 32 | 3 | 15 | 17 |
| 14 | 32 | 12 | 31 | 34 | 35 | 13 | 33 |
| 15 | 17 | 13 | 33 | 4 | 22 | 36 | 37 |
| 16 | 22 | 4 | 15 | 17 | 36 | 6 | 38 |
| 17 | 15 | 33 | 13 | 37 | 36 | 22 | 4 |
| 18 | 29 | 10 | 5 | 39 | 19 | 40 | 27 |
| 19 | 18 | 5 | 7 | 40 | 23 | 41 | 10 |
| 20 | 6 | 16 | 38 | 21 | 22 | 42 | 43 |
| 21 | 7 | 6 | 23 | 20 | 43 | 44 | 1 |
| 22 | 16 | 36 | 15 | 17 | 38 | 4 | 45 |
| 23 | 19 | 7 | 21 | 42 | 44 | 46 | 5 |
| 24 | 25 | 47 | 31 | 11 | 12 | 8 | 48 |
| 25 | 30 | 49 | 47 | 28 | 24 | 11 | 48 |
| 26 | 28 | 11 | 9 | 27 | | | |
| 27 | 26 | 9 | 10 | 29 | | | |
| 28 | 30 | 25 | 11 | 26 | | | |
| 29 | 27 | 10 | 18 | 39 | | | |
| 30 | 49 | 25 | 28 | | | | |
| 31 | 34 | 48 | 47 | 14 | 24 | 32 | |
| 32 | 14 | 35 | 34 | 31 | 12 | 33 | 13 |
| 33 | 32 | 35 | 13 | 14 | 17 | 15 | |
| 34 | 31 | 32 | 48 | 14 | | | |
| 35 | 32 | 34 | 14 | 33 | | | |
| 36 | 45 | 22 | 17 | 15 | 37 | 16 | |
| 37 | 33 | 17 | 45 | 15 | | | |
| 38 | 22 | 16 | 36 | 20 | 45 | | |
| 38 | 29 | 18 | 40 | | | | |
| 40 | 39 | 18 | 19 | 41 | 29 | | |
| 41 | 40 | 19 | 23 | 46 | 18 | | |
| 42 | 20 | 38 | 43 | | | | |
| 43 | 21 | 20 | 44 | 42 | | | |
| 44 | 23 | 41 | 46 | 43 | 7 | | |
| 45 | 36 | 37 | 17 | 15 | 22 | | |
| 46 | 41 | 23 | 44 | 19 | | | |
| 47 | 48 | 49 | 25 | 31 | | | |
| 48 | 47 | 31 | 49 | | | | |
| 49 | 30 | 47 | 25 | | | | |

L system synaptic strengths were found for the case in which no simulated electrical stimulation was delivered as well as for a number of cases in which simulated electrical stimulation was delivered to one or more regions. It was assumed that lightness system neurons in each non-stimulated column had a minimum frequency of 10 action potentials per second and a maximum frequency of 20 action potentials per second and that stimulation yielded a minimum frequency of 90 per second and a maximum frequency of 100 per second. Assignment of strengths was based on equation (9) in which the maximum strength $L_M=1$, $|\delta l_{i,j,\beta}|$ denotes a specific absolute difference in lightness between region i and region j, the maximum difference in lightness is given by $|\delta l_{i,j,\beta}|_M$ and β identifies the synapse. In the case of no simulated stimulation $|\delta l_{i,j,\beta}|_M=5.42247$ and in the presence of simulated electrical stimulation $|\delta l_{i,j,\beta}|_M$ had a minimum value of 35.8929 and a maximum value of 37.3426.

Individual G system synaptic strengths were determined by choosing $n_e$ or $n_i$ values for distance variables $d_{i,j,\alpha}$ that are uniformly distributed in the interval $0.9 \langle d_{i,j} \rangle < d_{i,j,\alpha} < 1.1 \langle d_{i,j} \rangle$, in which $\langle d_{i,j} \rangle$ equals the average of the minimum and maximum distances between regions i and ⟨ j. Similarly, individual L system synaptic strengths were determined by choosing $n_e$ or $n_i$ values for absolute differences in variables $|\delta l_{i,j,\beta}|(t)$ that are uniformly distributed in the interval $0.9 \langle |\delta l_{i,j}| \rangle < |\delta l_{i,j,\beta}| < 1.1 \langle |\delta l_{i,j}| \rangle$ where $\langle |\delta l_{i,j}| \rangle$ is the average of the minimum and maximum differences in lightness between the lightness intervals on regions i and j.

Simulations were also performed with an altered visual geometry in which both region 4 and region 5 were set equal to the union of regions 1, 4, and 5. In these simulations, all G system synaptic strengths to and from regions 4 and 5 were modified by finding new minimum and maximum distances within regions 4 and 5 and between regions 4 and 5 and their nearest neighbors. The minimum and maximum distances were used to find new mean distances, which were in turn used to calculate new mean G system synaptic strengths and unique strengths for each synapse.

The algorithm referred to in Section ID (1) and described in Example 1 was employed to calculate the times of simulated excitatory action potentials delivered to excitatory network neurons (i.e., the putative control parameter). Synchronous input to neurons was avoided by generating a spike train independently for each excitatory network neuron. A PyNEST script read files of these times and spike generators were employed to produce spikes. The production of times of occurrence of the desired number of additional action potentials in axons having different spatial orientations and locations from a stimulating electrode was simulated using the same algorithm. Because NEST does not provide a means for adding spike times to a running simulation, a spike generator for each neuron produced conductance changes using nearest neighbor synapses of the same strengths as those used by network neurons. Following completion of a simulation, the number of spikes produced in each second by each excitatory neuron and each inhibitory neuron in stimulated columns was increased by to establish consistency with setting the frequency of spikes produced by lightness neurons in stimulated columns to a value between 90 and 100 spikes/s.

A coefficient having the value 2.106 multiplied the strength of each synapse from an external excitatory neuron to an excitatory network neuron, and a coefficient having the value 2.75 multiplied the strength of each synapse between a pair of network neurons. These values were selected to make numbers of spikes produced by neurons in small test networks similar to those produced by network neurons and reported in Section I D.

B. Multinomial Logistic Regression Classification of Numbers of Spikes Produced by Excitatory and Inhibitory Neurons in 49 Columns Multinomial logistic regression was used to determine if this well-known and easily implemented machine learning technique could provide an accurate classification of the expected number of phosphenes using distributions of the numbers of spikes produced in is intervals of simulations of 10 s duration by pairs of excitatory and inhibitory neurons in all 49 columns as predictor variables.

In this example, the following steps were performed:

Let $x_i^T=(Nexc_{i,1}, Ninh_{i,1}, Nexc_{i,2}, Ninh_{i,2}, \ldots, Nexc_{i,N}, Ninh_{i,N})$ be the $i^{th}$ collection of pairs of numbers of spikes produced by an excitatory neuron and an inhibitory neuron in each of the N=49 columns. A training data set that is to be classified consists of pairs $(x_i, y_j)$ where each $y_j \in \{$"0", "1,", "2", "3"$\}$ and denotes the number of phosphenes that are present in the visual geometry. The posterior probability of class $y_j$ given $x_i$ is $Pr(y_j|x_i)=\exp(\beta_{y_j}^T \cdot x_i)/\Sigma_j^K \exp(\beta_{y_j}^T \cdot x_i)$, where the number of classes is K=4 and each $\beta_{y_j}^T = (\beta_{y_j,1}, \beta_{y_j,2}, \ldots, \beta_{y_j,2N})$ has as elements the model parameters for class $y_j$ (other than a bias term that is omitted for brevity of notation). Denote the entire parameter set for all K classes as $\theta=\{\beta_{y_1}^T, \beta_{y_2}^T, \ldots, \beta_{y_K}^T\}$ and the probability of an example $x_i$ belonging to class $y_j$ given $\theta$ as $p_{y_K}(x_1; \theta)$. With M collections of numbers of spike vectors in the training set, parameters are estimated by minimizing the loss function:

$$\sum_{i=1}^{M} -\log(p_{y_j}(x_i; \theta)) + \lambda_1 \sum_{i=1}^{n} |\beta_{y_{j,i}}| + \frac{\lambda_2}{2} \sum_{i=1}^{n} \beta_{y_{j,i}}^2. \quad (11)$$

The logistic regression function available in Mathematica was used with the default setting $\lambda_1=0$ and an optimization algorithm that approximates the Broyden-Fletcher-Goldfarb-Shanno algorithm using a limited amount of computer memory.

The numbers of spikes were obtained from simulations in which columns 1, 4, 5, or 12 might receive simulated electrical stimulation. As shown in Table III, the stimulated columns used in simulations were none, column 1, column 4, column 5, column 12, columns 1 and 4, columns 1 and 5, columns 1, 4, and 5, columns 4 and 5, columns 1 and 12, columns 4 and 12, columns 5 and 12, and columns 4, 5, and 12. The data that were classified were obtained from simulations in which G system strengths were based on the regions depicted in FIG. 10, and from simulations in which G system strengths were based on an altered visual geometry in which both regions 4 and 5 were made equal to the union of regions 1, 4, and 5. The altered visual geometry required changes in G system strengths to and from neurons in columns 4 and 5 that follow from changes in minimum and maximum visual distances as specified by equation (6).

TABLE III

13 CONDITIONS USED FOR MULTINOMIAL LOGISTIC REGRESSION

| Expected Number of Phosphenes | | Regions |
|---|---|---|
| Normal Visual Geometry | Altered Visual Geometry | Stimulated |
| 0 | 0 | None |
| 1 | 1 | 1 |
| 1 | 1 | 4 |
| 1 | 1 | 5 |
| 1 | 1 | 12 |
| 1 | 1 | 1, 4 |
| 1 | 1 | 1, 5 |
| 1 | 1 | 1, 4, 5 |
| 2 | 1 | 4, 5 |
| 2 | 2 | 1, 12 |
| 2 | 2 | 4, 12 |
| 2 | 2 | 5, 12 |
| 3 | 2 | 4, 5, 12 |

Training set spike times were obtained for each second of each simulation. For $e_j$ examples of spike number vectors classified as $y_j$, the total number of examples used to find the best-fit model is $2080=2\times10\times(N_E\times N_I)\times\Sigma_{j=1}^{4} e_j$ in which both unaltered and altered visual geometry simulations are used, there are 10, 1-second intervals available, $N_E=4$ and $N_I=2$ denote the number of excitatory and inhibitory neurons per region, and $\Sigma_{j=1}^{4} e_j=13$ for the 4 possible number-of-phosphene classifications.

C. Results (1) Replication and Increase in Duration of Neural Network Simulations Spanning 25 Cortical Columns Using NEST A major purpose of the simulations reported in Section ID was to determine if the frequency of extrinsically generated excitatory action potentials was characterized by a critical value at which excitatory or inhibitory neurons in all columns were actively interacting, thereby fulfilling a necessary condition for the emergence of the expected visual geometry and lightness interval distribution patterns. Results of simulations of 1 s duration showed that excitatory neurons fulfilled this condition when the putative control parameter had a value greater than 60 spikes/s, both in the absence and in the presence of simulated stimulation of neurons in the cortical column corresponding to visual region 1.

Figure 11A:
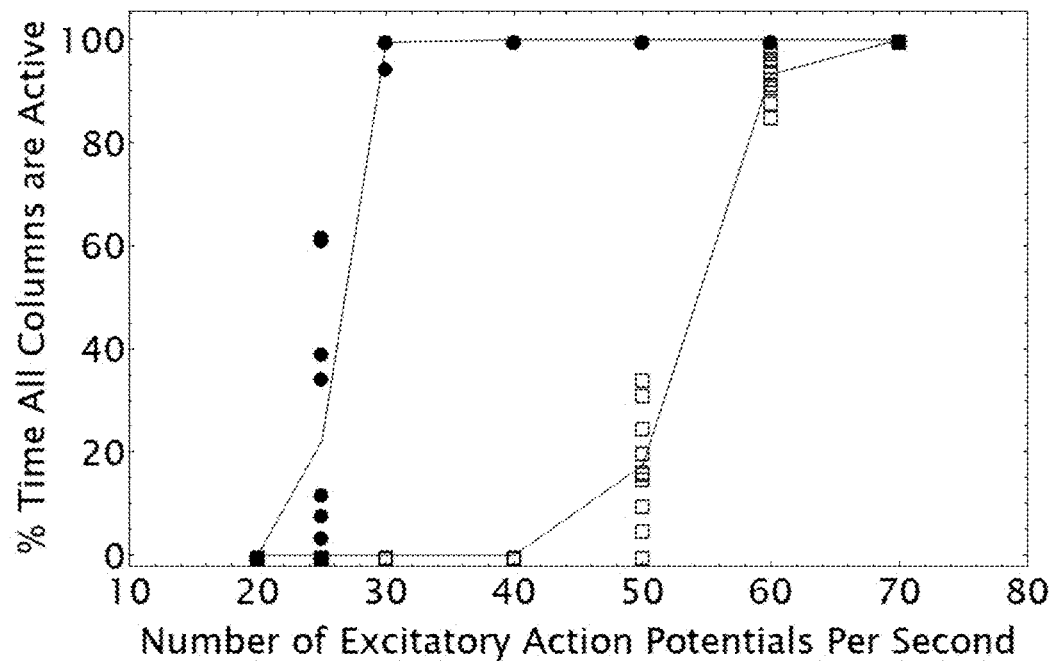
FIGS. 11A and 11B show the percentage of the final 900 ms of each of 10, 1 s segments of 10 s simulations during which excitatory (closed disks) and inhibitory (open squares) neurons in all 25 columns are producing non-zero values in synaptic conductance in target neurons. Lines join values averaged over the 10, 1 s intervals. Specifically, FIG. 11A show data in the absence of simulated stimulation and FIG. 11B show data in the presence of simulated stimulation of column 1 neurons.
Figure 11B:
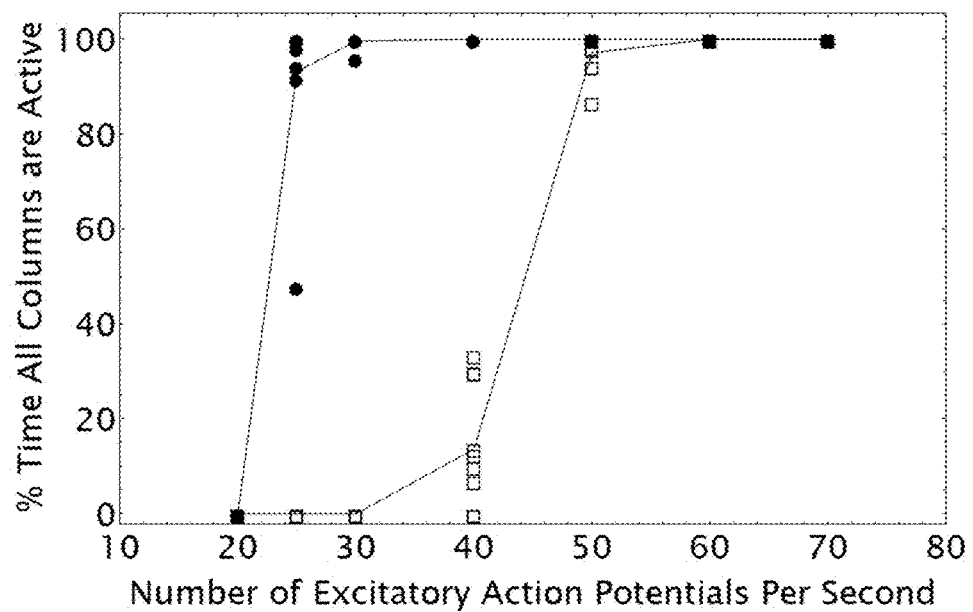

FIG. 11A illustrates results for each second of a set of 10 s NEST simulations in the absence of stimulation and FIG. 11B provides the same results in the presence of simulated stimulation of column 1 neurons. The overall shapes of these graphs are similar to those reported in Section ID. The most notable difference is the onset of active interactions among the neurons in all columns for lower values of the putative control parameter in the NEST simulations.

The availability of data for 10 segments of a 10 s simulation illustrates temporal variability in the percentage of time that neurons in all columns are active just prior to a jump from 0% to 100%. As reported previously, this behavior is characteristic of the self-organization of patterns and occurs near critical values of a control parameter where changes in the value of an order parameter occur.

Distributions of numbers of spikes produced by excitatory and inhibitory neurons obtained from the initial simulations were reported for a control parameter value of 90 spikes/s in Section ID. The excitatory neuron distributions for both no stimulation and stimulation conditions had a much narrower range than the inhibitory neuron distributions. Because of the lower values of the control parameter required to achieve active interactions among neurons in all columns found with NEST simulations, distributions were found using a control parameter value of 70 spikes/s and are displayed in FIG. 12. The differences between no stimulation and stimulation conditions and between excitatory and inhibitory neurons are similar to those found in the initial simulations.

(2) NEST Simulations of a Neural Network Spanning 49 Cortical Columns

Figure 9B:
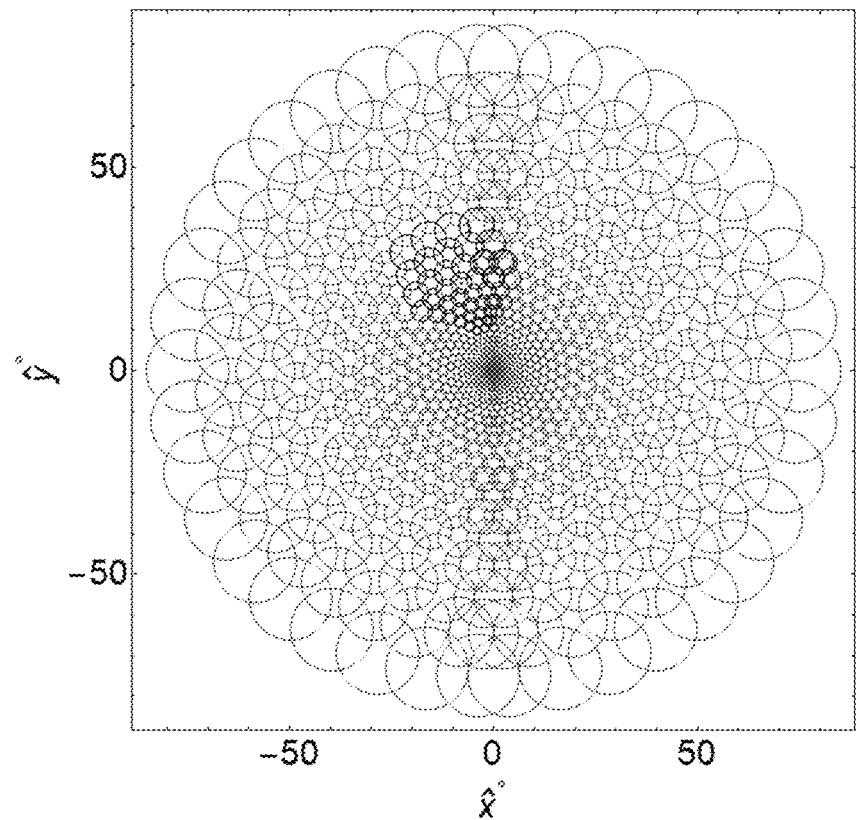
FIG. 9B shows the same idealized CPV geometry constructed from the V1 geometry as FIG. 2B with a larger number of darkened cortical columns and visual geometry regions that are used in simulations of increased scale and duration.
Figure 10:
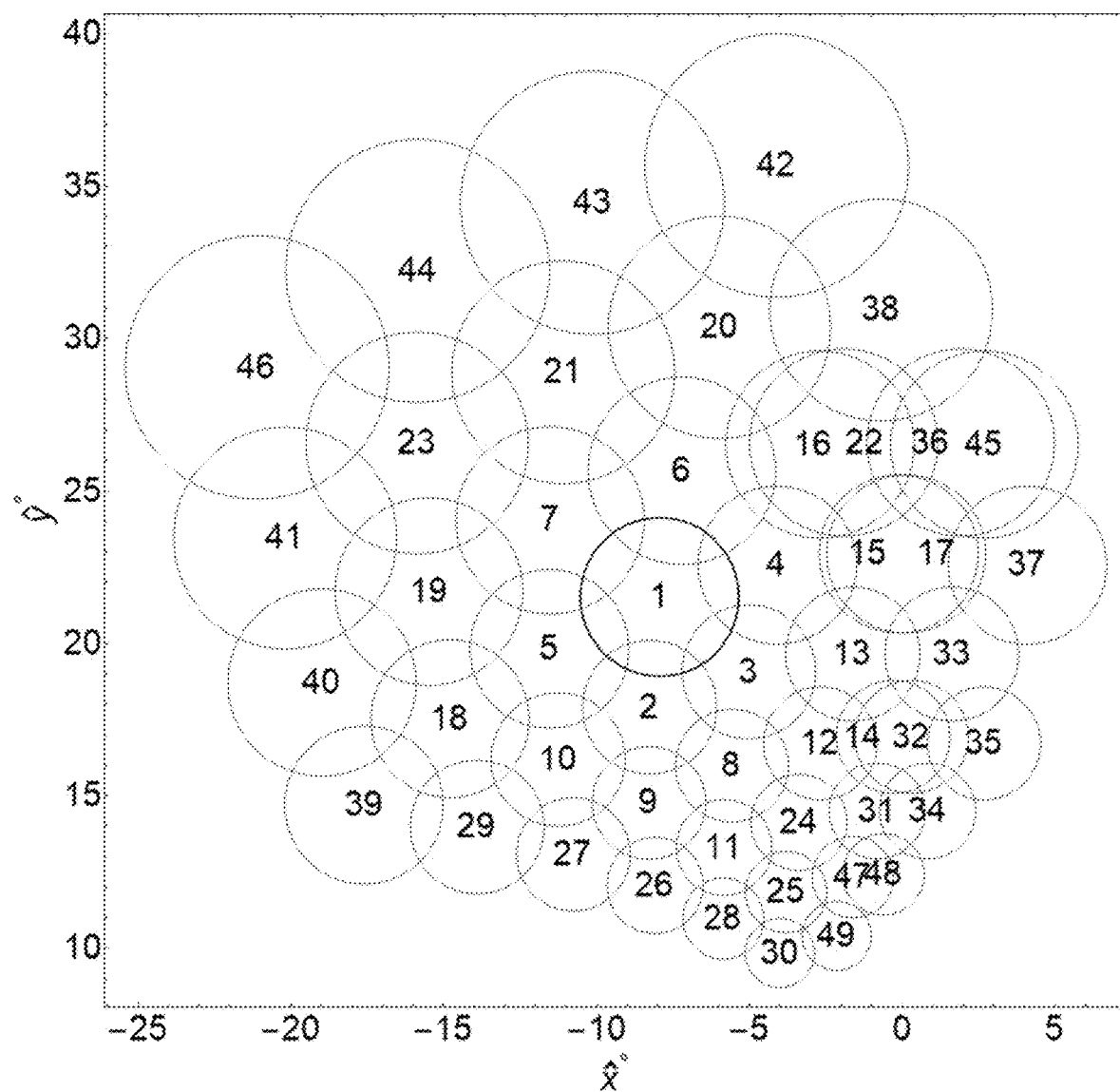
FIG. 10 shows an enlarged depiction of the darkened visual geometry regions shown in FIG. 9B and identified with numbers used in all subsequent descriptions and analyses of simulation data.
Figure 12A:
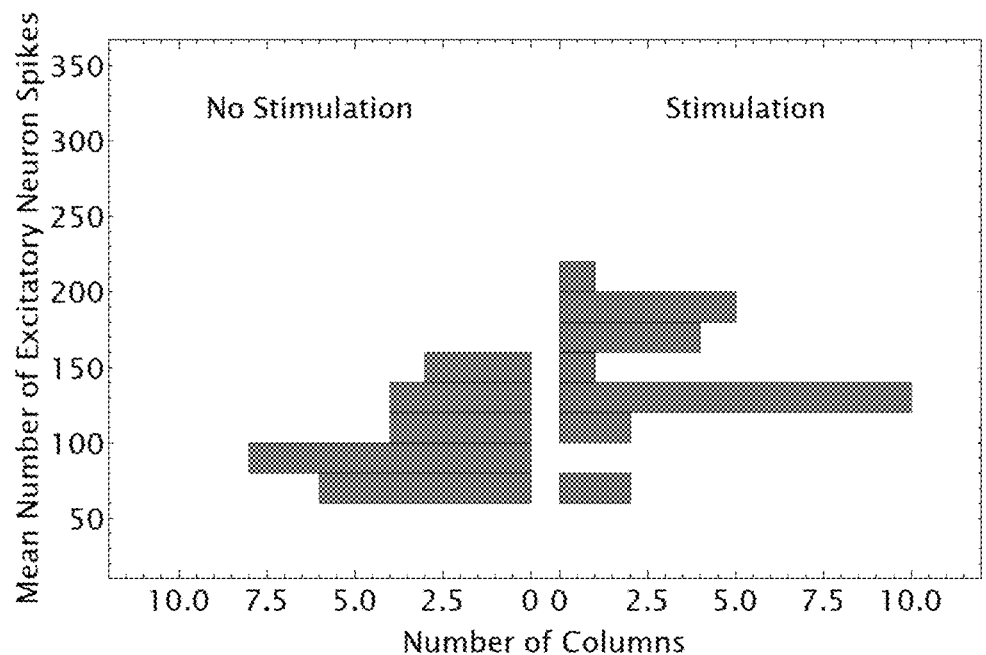
FIG. 12A shows the distributions of numbers of spikes for network excitatory neurons and FIG. 12B shows network inhibitory neurons in columns 1-25 averaged over 10 s simulations for both no stimulation and stimulation conditions, wherein the frequency of extrinsic excitatory action potentials was set to 70/s.
Figure 12B:
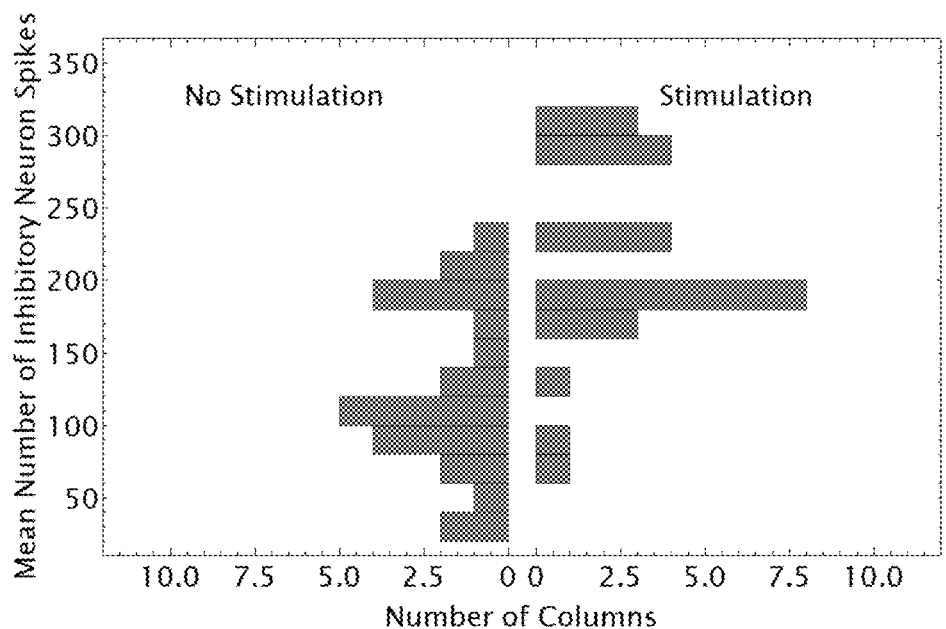
Figure 13A:
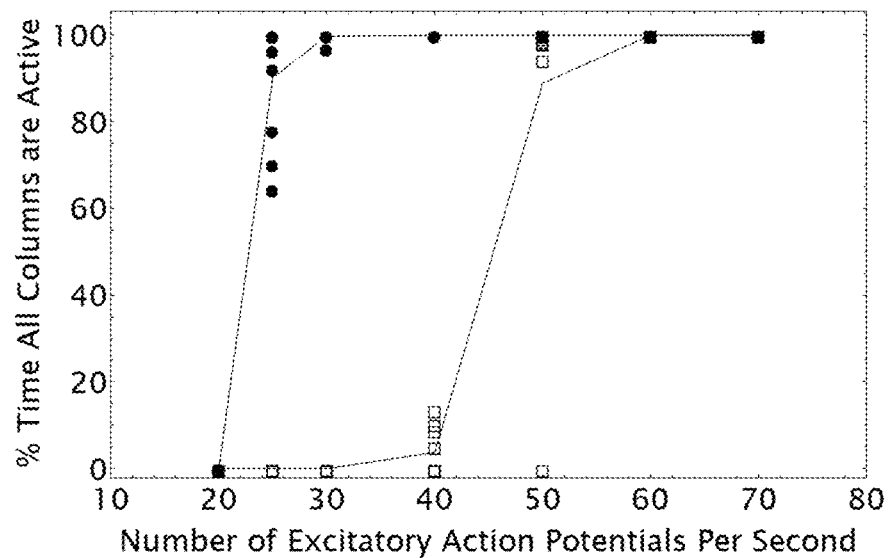
FIGS. 13A and 13B show the percentage of the final 900 ms of each of 10, 1 s segments of 10 s simulations during which excitatory (closed disks) and inhibitory (open squares) neurons in all 49 columns are producing non-zero values in synaptic conductance in target neurons. Lines join values averaged over the 10, 1 s intervals. Specifically, FIG. 13A show data in the absence of simulated stimulation and FIG. 13B show data in the presence of simulated stimulation of column 1 neurons.
Figure 13B:
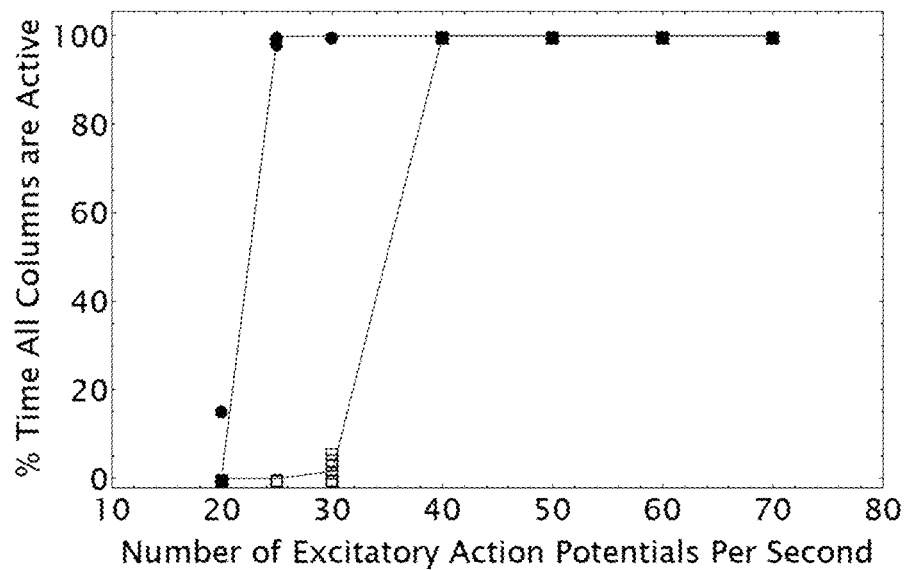
Figure 14A:
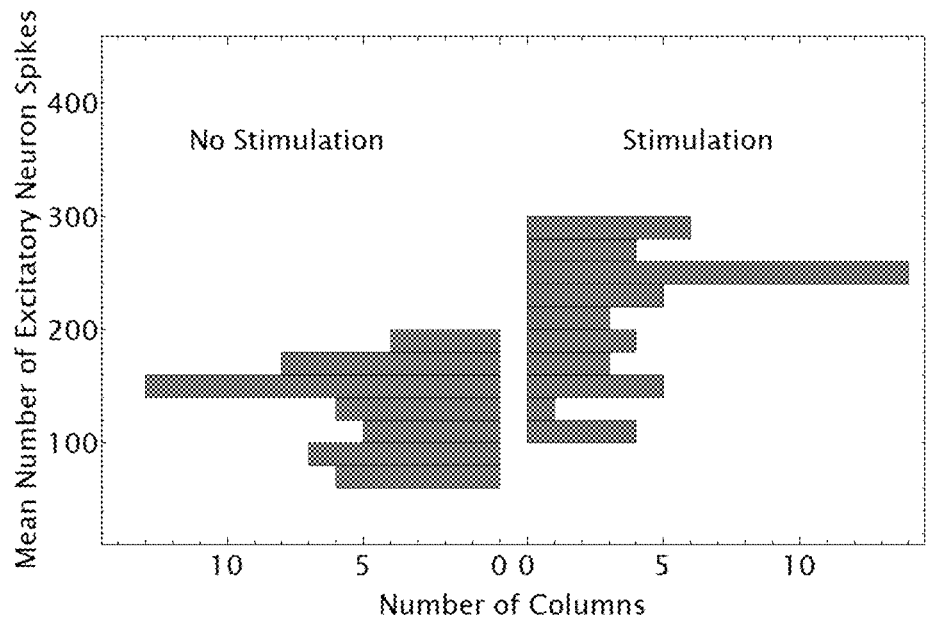
FIG. 14A shows the distributions of numbers of spikes for network excitatory neurons and FIG. 14B shows network inhibitory neurons in columns 1-49 averaged over 10 s simulations for both no stimulation and stimulation conditions. The frequency of extrinsic excitatory action potentials was set to 70/s.
Figure 14B:
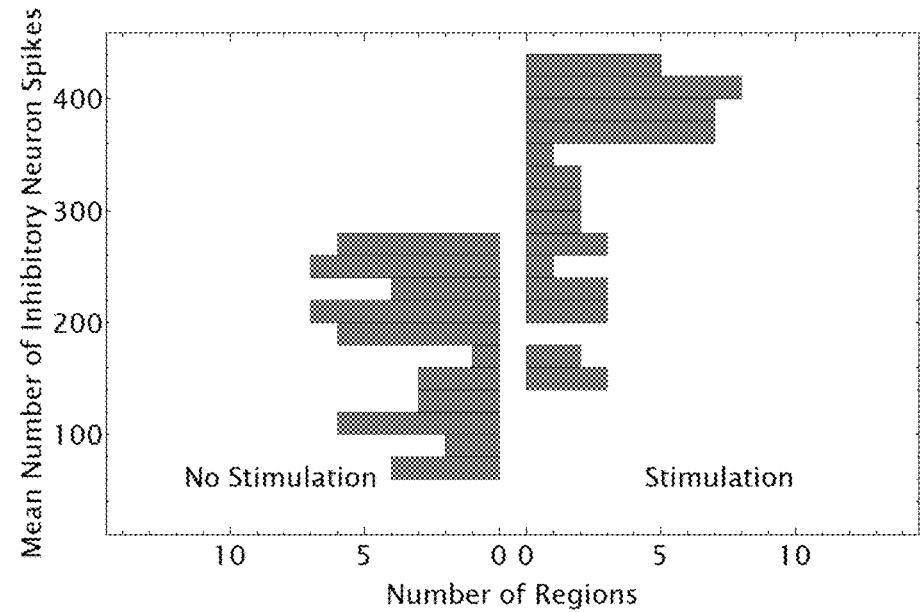

Results found using 10 s simulations of neurons in the 49 columns corresponding to the visual regions shown in FIG. 9B and FIG. 10 are displayed in FIGS. 13 and 14. Comparison of these results with FIG. 11 and FIG. 12 show that nearly doubling the scale of the simulations produces qualitatively similar results with a lower critical value of the control parameter and greater maximum values of spike numbers.

Figure 15A:
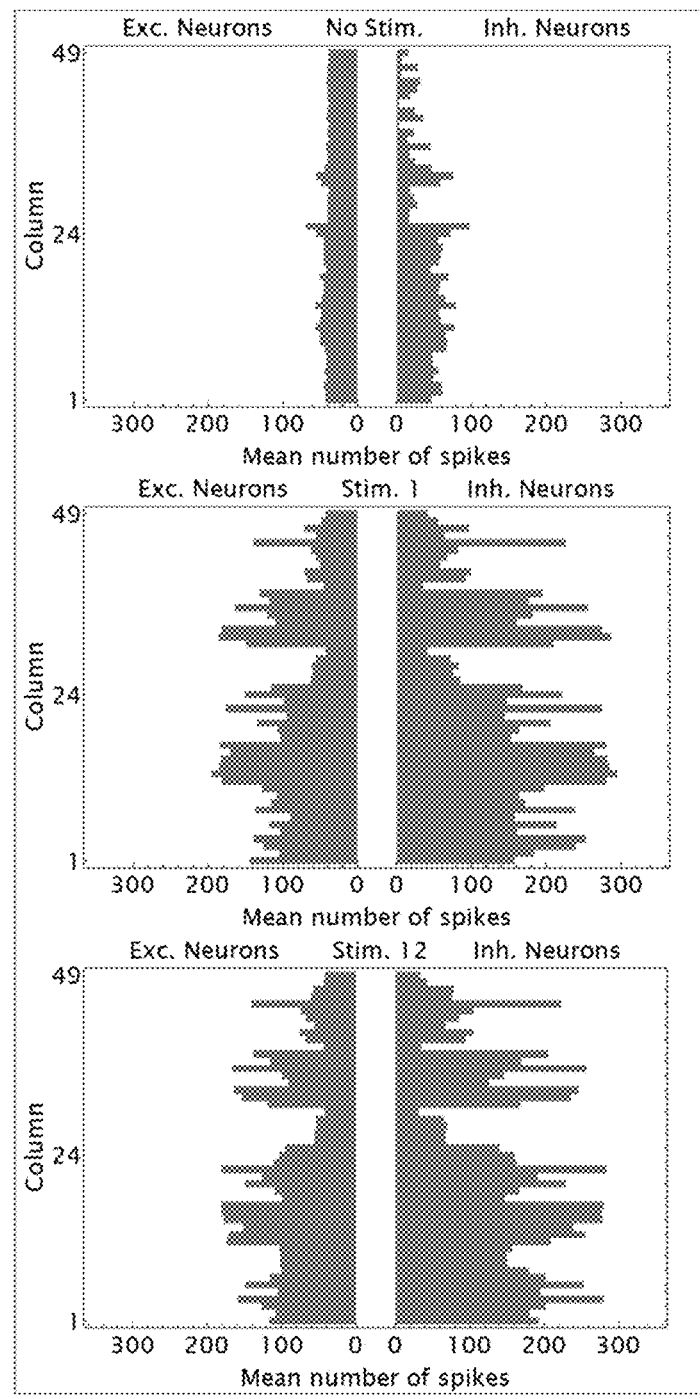
FIGS. 15A and 15B show examples of distributions of mean numbers of spikes produced by the neurons in each column during the first second of a 10 s simulation in which 40 excitatory spikes/s were delivered to excitatory network neurons. Specifically.
Figure 15B:
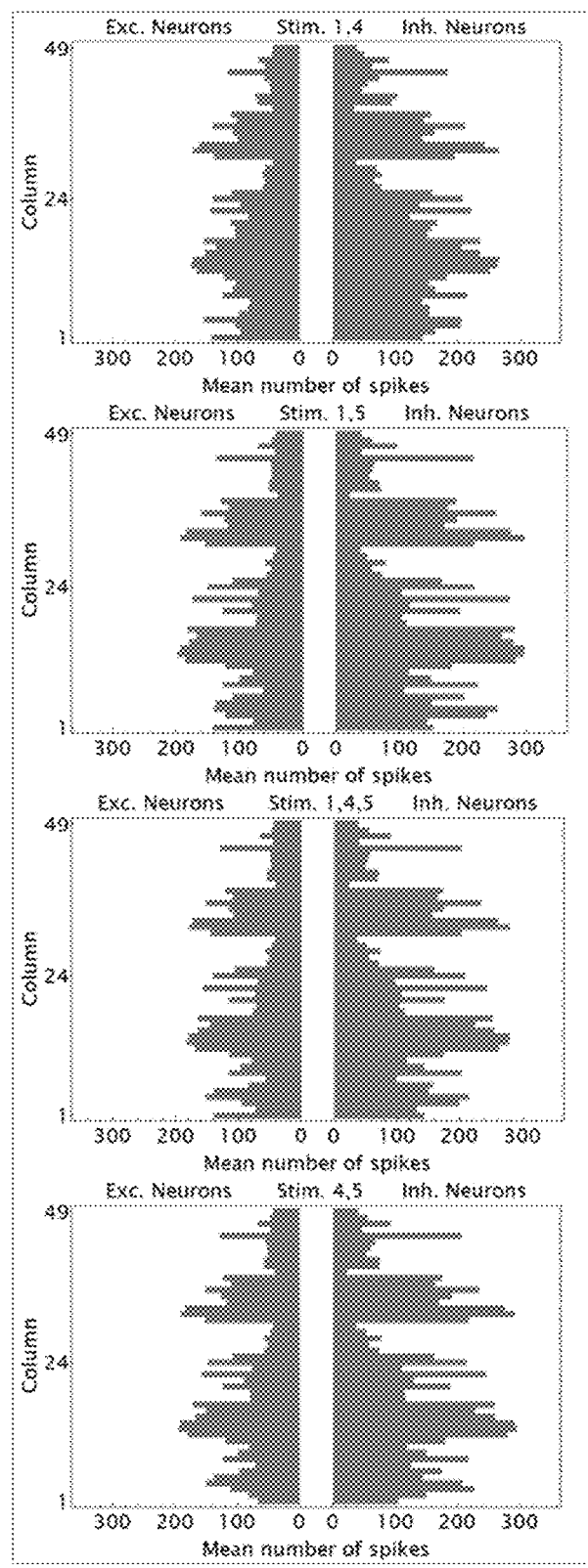

(3) Using Distributions of Numbers of Spikes Produced by Neural Network Neurons to Detect the Number of Phosphenes Examples of the mean number of spikes produced by the 4 excitatory neurons and 2 inhibitory neurons in each column during the first second of a 10 s simulation for the unaltered visual geometry shown in FIG. 9B and FIG. 10 during which 40 excitatory spikes/s were delivered to excitatory network neurons are shown in FIG. 15. The cases depicted in FIG. 15A were chosen because they illustrate dramatic differences in the spike distributions when no simulated stimulation is delivered (top panel) and when neurons in either column 1 (middle panel) or column 12 (bottom panel) are stimulated. The distributions shown in FIG. 15B were chosen because they illustrate what appear to be cases for which correct classification of numbers of phosphenes may be much more challenging. Visual regions 1 and 4 and regions 1 and 5 overlap, and therefore the cases in which columns that correspond to regions 1 and 4, 1 and 5, and 1, 4, and 5 are stimulated are all expected to give rise to a single phosphene. However, stimulation of columns corresponding to visual regions 4 and 5, which do not overlap, is expected to give rise to two phosphenes.

Figure 16A:
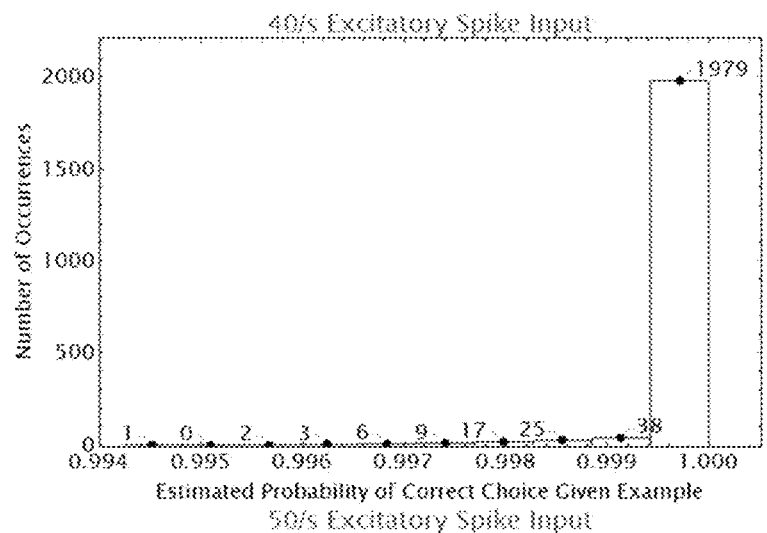
FIGS. 16A, 16B and 16C show the frequency of occurrence of all posterior probability estimates for correct choices of the expected number of phosphenes for each of the 2080 examples that result from simulations in which the control parameter has values of 40/s in FIG. 16A, 50/s in FIG. 16A, and 60/s in FIG. 16A. Bin widths are $5.7777 \times 10^{-4}$, $5.7943 \times 10^{-5}$ and $1.2255 \times 10^{-4}$ from top to bottom.
Figure 16B:
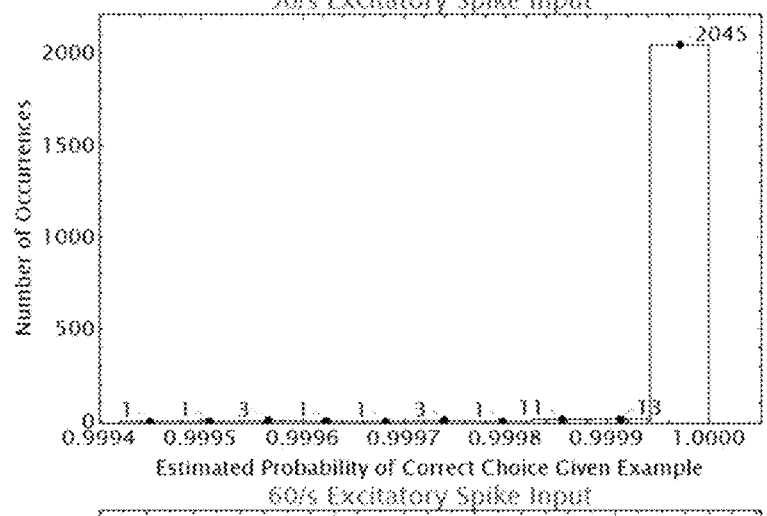
Figure 16C:
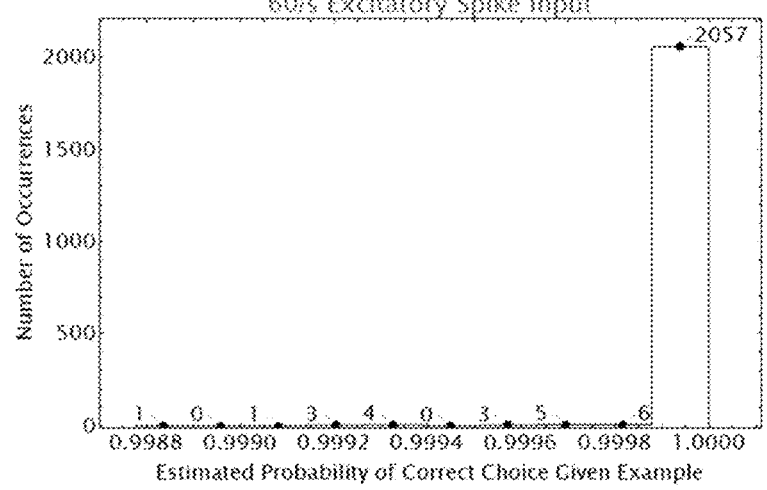

Given the apparent difficulty of the classification task, it was surprising that each of the 2080 classifications produced by the resulting classification function was correct for excitatory spike frequencies of 40/s, 50/s, and 60/s. The mean cross entropy values for simulations with excitatory spike frequencies of 40/s, 50/s, and 60/s were $9.81 \times 10^{-5}$, $3.40 \times 10^{-6}$, and $6.81 \times 10^{-6}$, respectively. Furthermore, the multinomial logistic regression model's estimated conditional (posterior) probabilities of the correct number of phosphenes given each of the 2080 spike number examples are extremely high, as shown in FIG. 16. These data show that numbers of excitatory and inhibitory spikes can be used to classify the number of phosphenes with great accuracy even when the data arise from a mixture of visual geometries.

(4) Simulating Essential Features of a Prosthetic Device that is Predicted to Create a Visual Geometry It was proposed in Section II that producing a second visual geometry in order to create unified visual forms requires: (1) using electrodes to stimulate and to record activity intermittently from each population for which an electrode is available; (2) generating a neuromorphic spike if population activity is greater than a threshold; (3) delivering spikes from all populations to a model neuron for each population via G system conductance-based synapses; and (4) using the membrane potential of each model neuron to determine the contribution of the recorded activity to modulation of stimulation amplitude for each population.

Figure 17:
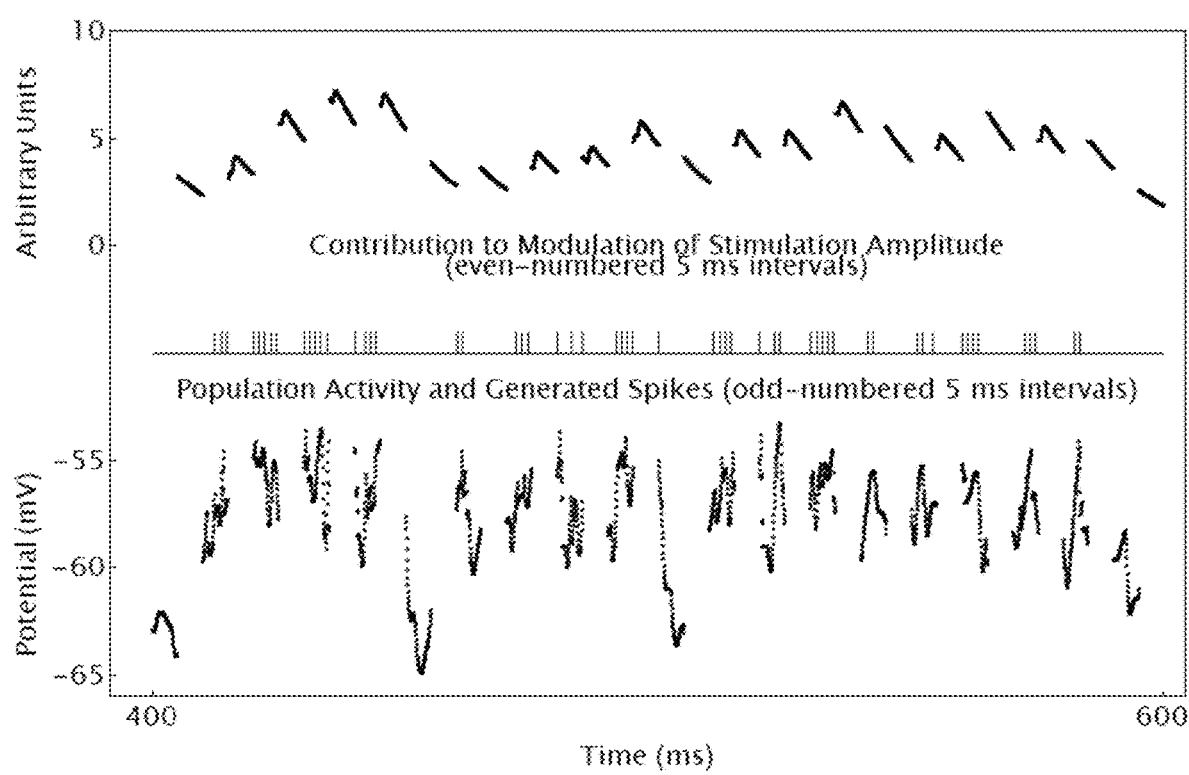
FIG. 17 shows simulated activity of column 1 neurons and simulated spikes resulting from values greater than −57 mV during odd-numbered 5 ms intervals, and the membrane potential of a model neuron that is influenced by these spikes via G system synapses during even-numbered 5 ms intervals. Data are displayed for 200 ms in order to provide a clear visualization of the data for each interval and the impact of spikes on the contribution of column 1 activity to modulation of intermittent stimulation of column 1 neurons.

The essential functions of the proposed device are illustrated in FIG. 17 using data from a is simulation in which neurons in columns 1 and 12 received simulated stimulation, 40 extrinsic spikes/s were delivered to excitatory network neurons, G system synaptic strengths were based on an unaltered visual geometry, and the membrane potential of a single model neuron was recorded. Population activity of column 1 neurons was simulated by computing the average membrane potential of the 4 excitatory and 2 inhibitory neurons during odd-numbered 5 ms intervals, thereby providing 100 samples for each such interval. A spike was generated at time t* during an odd-numbered interval if simulated population activity was greater than a threshold of −57 mV and at least 1 ms had passed since the previous spike occurred. This threshold was found to yield a number of model spikes that is sufficient to provide a visualization of their impact on a model neuron's membrane potential.

The spikes that were generated on odd-numbered 5 ms intervals were delivered to an integrate and fire model neuron with conductance-based synapses and G system strengths based on distances from visual region 1 to itself, thereby modulating the neuron's membrane potential on even-numbered 5 ms time intervals. Inspection of FIG. 17 shows that fluctuations in the simulated population activity produce corresponding changes in the population's contribution to the modulation of stimulation amplitude.

While specific embodiments have been described in detail, it will be appreciated by those skilled in the art that various modifications and alternatives to those details could be developed in view of the overall teachings of the disclosure. Accordingly, the particular embodiments disclosed are meant to be illustrative only and not limiting as to the scope of the processes described herein, which are to be given the full breadth of the appended claims and any and all equivalents thereof.

What is claimed is:

1. A sense element engagement process for creating visual geometry and lightness interval distribution of space, sense, and time (SXT) patterns which characterize cortical prosthetic vision (CPV) to make predictions for testing an aspect of a visual experience on individuals, comprising the steps of:
   identifying an aspect of a visual experience to be engaged by an electronic neural network (ENN);
   conceptualizing the aspect of the visual experience and coordinated portions of interactions in a neural network as jointly constituting an SXT pattern which is characterized by one or more order parameters;
   modeling the SXT pattern using mappings comprised of spatiotemporal (ST) to sensible-temporal (XT);
   describing emergence of self-organization of the SXT pattern;
   creating a simulation of a system of synaptic interactions; and
   employing results of simulations to create a physical instantiation of the system of synaptic interactions in an ENN.

2. The sense element engagement process of claim 1, wherein modeling the SXT pattern using mappings comprised of spatiotemporal (ST) to sensible-temporal (XT)

further comprises specifying a system of synaptic interactions which engage sense (X) elements of the SXT pattern.

3. The sense element engagement process of claim 2, further comprising identifying a state of the neural network that coordinates with a stable SXT pattern.

4. The sense element engagement process of claim 3, further comprising identifying the X element of the SXT pattern on which strengths of synaptic interactions in the system depend.

5. The sense element engagement process of claim 4, further comprising identifying a control parameter having a critical value above which the SXT pattern emerges.

6. The sense element engagement process of claim 1, wherein describing the emergence of the SXT's pattern of self-organization further comprises specifying temporal variations in the order parameter of the SXT pattern which depend on a value of a potential.

7. The sense element engagement process of claim 6, further comprising providing a mathematical description of the potential as a function of the one or more order parameters and the control parameter.

8. The sense element engagement process of claim 7, further comprising introducing a mapping from the values of a variable that behaves like the X element of the SXT pattern on which strengths of synaptic interactions depend.

9. The sense element engagement process of claim 8, further comprising identifying an ST variable that is coordinated with the order parameter and possessing variability which accounts for the dependence of the order parameter on the value of the potential.

10. The sense element engagement process of claim 9, further comprising specifying mappings of X to S which emerge from the identification of the ST variable.

11. The sense element engagement process of claim 1, further comprising predicting how modification of one or more parameters of the neural network produces a change in the aspect of the visual experience in an individual.

12. The sense element engagement process of claim 1, further comprising using the simulations and the ENN to develop hardware capable of modifying the visual experience in an individual.

13. The sense element engagement process of claim 12, wherein the hardware may be employed for the development of machine intelligence.

14. The sense element engagement process of claim 1, wherein the process is employed for other aspects of human sentience.

15. The sense element engagement process of claim 1, wherein the other aspects of human sentience comprise hearing, taste, smell, and touch.

* * * * *